US008166040B2

(12) United States Patent
Brindisi et al.

(10) Patent No.: US 8,166,040 B2
(45) Date of Patent: Apr. 24, 2012

(54) HANDHELD DEVICE AND KIOSK SYSTEM FOR AUTOMATED COMPILING AND GENERATING ITEM LIST INFORMATION

(75) Inventors: Richard G. Brindisi, Naples, FL (US); Greg A. Vittardi, Broadview Heights, OH (US)

(73) Assignee: SmartShopper Electronics, LLC, Solon, OH (US)

( * ) Notice: Subject to any disclaimer, the term of this patent is extended or adjusted under 35 U.S.C. 154(b) by 0 days.

(21) Appl. No.: 13/208,735

(22) Filed: Aug. 12, 2011

(65) Prior Publication Data

US 2011/0302059 A1 Dec. 8, 2011

Related U.S. Application Data

(63) Continuation of application No. 12/917,907, filed on Nov. 2, 2010, which is a continuation-in-part of application No. 12/897,259, filed on Oct. 4, 2010, now abandoned, which is a continuation-in-part of application No. 11/532,275, filed on Sep. 15, 2006.

(60) Provisional application No. 60/717,939, filed on Sep. 16, 2005.

(51) Int. Cl.
*G06F 7/00* (2006.01)
*G06F 17/30* (2006.01)

(52) U.S. Cl. ...................................................... 707/741
(58) Field of Classification Search .................. 707/741
See application file for complete search history.

(56) References Cited

U.S. PATENT DOCUMENTS

| 5,884,281 A | * | 3/1999 | Smith et al. | 705/26.8 |
| 2001/0051901 A1 | * | 12/2001 | Hager et al. | 705/26 |
| 2002/0027164 A1 | * | 3/2002 | Mault et al. | 235/462.46 |

* cited by examiner

*Primary Examiner* — John R. Cottingham
*Assistant Examiner* — Nicholas Allen
(74) *Attorney, Agent, or Firm* — Tucker Ellis LLP

(57) ABSTRACT

A portable handheld electronic device is in communication with a stationary kiosk device. The portable device provides automated compiling and categorizing of items and generating of categorized item lists in accordance with user-defined preferences including user-defined categories, and includes a memory for storing the assortment data, and categorizing means adapted for assigning respective predetermined and/or user-selected categories to the assortment data. Generating means compile and synchronize selected categories, and generate the item list relative to one or more user-selected categories that is further displayed and printed at request of the user. A signal receiving circuit of the kiosk device communicates with a signal generating circuit of the portable device and generates received categorized item list data in accordance with a received item list signal, and a human user interface generates a human readable display representative of the categorized item list information in accordance with the received categorized item list data.

48 Claims, 13 Drawing Sheets

702

MARKET

MILK          DAIRY; TOPS

CHICKEN       PUBLIX-ISLE SIX

CAR PARTS STORE

OIL FILTER    BOB'S LIST

UNKNOWN

DRESS         MOM'S LIST

BOB'S LIST

OIL FILTER    CAR PARTS STORE

MOM'S LIST

DRESS

UNKNOWN

MILK (1 gal)   DAIRY; TOPS; MARKET

CHICKEN        PUBLIX-ISLE SIX; MARKET

Figure 7b

HANDHELD DEVICE AND KIOSK SYSTEM FOR AUTOMATED COMPILING AND GENERATING ITEM LIST INFORMATION

CROSS-REFERENCE TO RELATED APPLICATIONS

This application is a continuation of U.S. patent application Ser. No. 12/917,907 filed Nov. 2, 2010, which is a continuation in part application of U.S. patent application Ser. No. 12/897,259 filed Oct. 4, 2010 now abandoned, which is a continuation in part application of U.S. patent application Ser. No. 11/532,275 filed Sep. 15, 2006, which was based on and claimed priority to provisional U.S. patent application Ser. No. 60/717,939, which was filed on Sep. 16, 2005, the entirety of which are incorporated herein by reference.

BACKGROUND OF THE INVENTION

The subject application relates generally to a portable handheld electronic device and system having an easy to hold ergonomic carrying housing for automatically compiling and generating item list information. In particular, the subject application is directed to household management and provides efficient recording and categorizing of household tasks, purchases, errands, and the like. The items may be arranged, stored, and presented according to user-selected categories based on user item category preferences such as categories based on particular retail establishments, location within establishments, establishment types, an identity of the user or any other one or more categories as necessary or desired. The portable handheld electronic device and system of the subject application are also capable of being efficiently used in office management, business-to-business management, restaurant management, plumbing and building contractor operations and the like. The system, method, and portable handheld electronic device of the subject application are capable of being advantageously used, for example and without limitation, by or on any hardware, software, network or system platform, and the like.

A typical household user usually makes notations on a pad or piece of paper when certain items, such as foods and household parts, cleaners, and the like, require replacement. Generally, the same techniques are used to remind the household user of certain tasks that need to be performed, such as errands, which are written down. A problem arises, however, as the list gets longer and organization is lacking, as items at the bottom of the list should be grouped with those somewhere in the middle, and the tasks are interspersed with the food items. In addition, the list may become lost or unreadable, as typically, the list is located on a kitchen countertop, wall, or appliance. Frequently, the list is incomplete as the user is unable to locate a writing instrument to update the list with a newly desired item. Furthermore, the list is usually written by one member of the household, but when another member is asked to retrieve the items or perform the tasks, the handwriting used by the first member is illegible to the other member, resulting in items on the list that do not get purchased, or replaced, and tasks on the list that do not get performed.

Portable recording and dictation mechanisms are known in the art, but they are typically difficult to hold and operate in general and particularly while performing other tasks. In addition, these prior devices are incapable of organizing any of the voice encoded data stored therein in accordance with user-selected categories or the like and are therefore not convenient.

SUMMARY OF THE INVENTION

In accordance with the subject application, there is provided a portable handheld electronic device and stationary kiosk system for receiving, categorizing, storing and outputting user defined list information wherein items are organized into user-selected categories based on item category preferences of the one or more users of the device.

Further, in accordance with the subject application there is provided a portable handheld electronic device and stationary kiosk system that is not dependent on a handwriting and/or memory of a specific user.

Further, in accordance with the subject application there is provided a portable handheld electronic device and stationary kiosk system for automatically compiling categorized item lists in accordance with user-defined preferences.

Further, in accordance with the subject application, there is provided a portable handheld electronic device and stationary kiosk system for delivering advertisement materials and information from a stationary kiosk at a location to users of portable handheld devices in communication with the kiosk, the advertisement materials and information including for example offerings of discounts on close out items at the location or fixed or variable percentages (%) off of certain selected items at the location. The kiosk may display offers on a screen viewable by the user or may print coupons redeemable for the close out or other discounts.

Still further, in accordance with a first example embodiment of the subject application, there is provided a portable handheld electronic device and stationary kiosk system for automated compiling and generating item list information including a housing and receiving means adapted for receiving, from an associated user, first assortment data and first category data, the first assortment data being inclusive of at least one first item and the first category data being representative of first item category preferences defined by the associated user. The system also includes storage means adapted for storing the received first assortment and category data in electronic form. Also included in the system are categorizing means and generating means. The categorizing means is adapted for assigning a first user-selected category to the at least one first item included in the received assortment data based on the item category preferences of the user in accordance with the category data. The assigned first category is, preferably, any of the group including alphabetical order, similar items, temporal order, and user-defined order, a sales outlet name, a sales outlet type, a location within a sales outlet, a designation of a user's name associated with the device, or any other category. The generating means is adapted for compiling and generating first item list information representative of the received first assortment data in accordance with the assigned first user-selected category. A data connection means of the system is adapted for communicating at least a portion of the first item list information to an operatively associated external processing device of a stationary kiosk device. Display means also included in the system, is adapted for displaying the first item information list representative of the received first assortment data in accordance with the assigned first user-selected category.

In accordance with another example embodiment, a method is provided for automated compiling and categorizing items, and generating item list information using a hand held system including a processor, and a memory. In this example embodiment, the method comprises receiving by a receiving means of the system, from an associated user, first assortment data inclusive of at least one first item and first category data representative of first item category preferences defined by the associated user, storing by storage means in the housing the received first assortment data in electronic form, assigning by categorizing means in the housing a first user-selected category to the at least one first item included in the received first assortment data in accordance with the first category data based on the first item category preferences defined by the associated user, compiling and generating by generating means in the housing first item list information representative of the received first assortment data in accordance with the assigned first user-selected category, communicating by a data connection portion or circuit of the system at least a portion of the first item list information to an operatively associated external processing device of a stationary kiosk device, and displaying by display means of the kiosk device the first item list information representative of the received first assortment data in accordance with the assigned first user-selected category.

In accordance with yet another example embodiment of the subject application, there is provided a portable electronic device for automated compiling and categorizing items, and generating item list information. The device includes a housing with a user interface including input portion and a local graphical display. The input circuit is adapted for receiving, from an associated user, assortment data inclusive of at least one item and category data representative of item category preferences of the associated user. The portable electronic device includes a storage device adapted for storing the received assortment data in electronic form and a categorizing portion adapted for assigning a user-selected category to the at least one item included in the received assortment data in accordance with the category data. The assigned category is, preferably, at least one or more of the group including an alphabetical order, similar items, temporal order, user-defined order, a sales outlet name, a sales outlet type, a location within a sales outlet, a designation of a user associated with the at least one first item, and others as necessary or desired. Also included in the portable electronic device are a generating portion and a output portion. The generating portion is adapted for compiling and generating item list information representative of the received assortment data in accordance with the assigned user-selected category. The list is selectively transmitted to a stationary kiosk device. A graphical display local to the kiosk is adapted for displaying the item list information representative of the received assortment data in accordance with the assigned user-selected category. The output circuit is adapted for outputting the item list information at the kiosk in a format arranged in accordance with the assigned user-selected category.

In accordance with yet another example embodiment of the subject application, there is provided a system for automated compiling and generating categorized item list information. The system in general comprises a portable device and a stationary kiosk device. With regard in particular to the portable device, a data input is operable to receive, from an associated user during each of a plurality of transactions, first input specifying a corresponding plurality of user-selected items. A data storage is operable for storing received assortment data corresponding to each of the plurality of user-selected items, and is further operable for storing category data representative of item categories assigned to each of the plurality of items included in the assortment data. A user input is operable to receive, from the associated user, a list generation instruction. Still further, a list generator is responsive to the list generation instruction and is operable to compile the plurality of user selected items specified during each of the plurality of transactions and to generate categorized item list information representative of each of the user selected items categorized in accordance with the assigned category such that at least two of the user-selected items are listed contiguously and associatively with a corresponding category. A signal generating circuit is operable to selectively generate an item list signal representative of the categorized item list information. With regard in particular to the stationary kiosk device, a signal receiving circuit is in operative communication with the signal generating circuit of the portable device and operable to selectively receive the item list signal. A convertor circuit is operable to generate received categorized item list data in accordance with the received item list signal, and a human user interface is operable to generate a human readable display representative of the categorized item list information in accordance with the received categorized item list data.

Still other example embodiments and aspects of the present invention will become readily apparent to those skilled in this art from the following description wherein there is shown and described preferred embodiments of this invention, simply by way of illustration of one of the best modes suited for carrying out the invention. As it will be realized, the invention is capable of other different embodiments and its several details are capable of modifications in various obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention and serve to explain the principles of the embodiments of the invention.

FIGS. 7a and 7b are diagrams illustrating item lists generated in accordance with one or more of predetermined and user-selected categories assigned to items;

DETAILED DESCRIPTION OF THE PREFERRED EMBODIMENTS

The subject application is directed to household management and provides efficient recording of planning for household tasks to be performed, purchases to be made, errands to be run, and the like. More particularly, the subject application is directed to a system, method, and handheld device suitably adapted to receive, store, synchronize, compile, generate, and output user defined list information of items at a kiosk or other suitable device disposed at selected centralized locations such as, for example, retail establishments, selectively together with promotion and/or brand recommendation data relating to the items such as, for example coupons, close out offerings or xx % off of certain selected items. In particular, the subject application is directed to a system, method, and portable electronic device having an easy to hold casing or housing and being capable of receiving assortment data and category data from an associated user, receiving promotion data from an associated source, compiling the assortment and category data into a list in a predetermined order or arrangement in accordance with the category data, and outputting the same in accordance with a user initiated command. Where appropriate, the promotion data is listed in association with the assortment data and communicated to a kiosk device for showing on a display or printed onto the end of a tape roll or the like for the convenience of the user at the location of the kiosk. In one form, the promotion data is data representative of close out offerings on selected items, percentage off coupons, a promoted source of the items such as a particular item brand, and in another form, the promotion data is coupon data for generating a sales coupon applied at a point of sale or used during a sales transaction for a product cost discount. The coupon data may identify a particular brand, it may relate to a rebate, or it might identify a sales venue. The brand recommendation data, promotion data, and coupon data may be stored in either the portable device or the kiosk or both. The portable device may receive the brand recommendation data, promotion data, and coupon data from an external associated source such as, for example, from an Internet account at the residence of the user of the system. The kiosk device may receive the brand recommendation data, promotion data, and coupon data from an external associated source such as, for example, from a brand manufacturer or from a retail outlet. In one embodiment, the brand recommendation data, promotion data, and coupon data of the portable device is used at the kiosk location, and in another the data of the kiosk is used, and in yet a further embodiment, the data of the portable device is merged with the data of the kiosk at the kiosk location.

Figure 1:
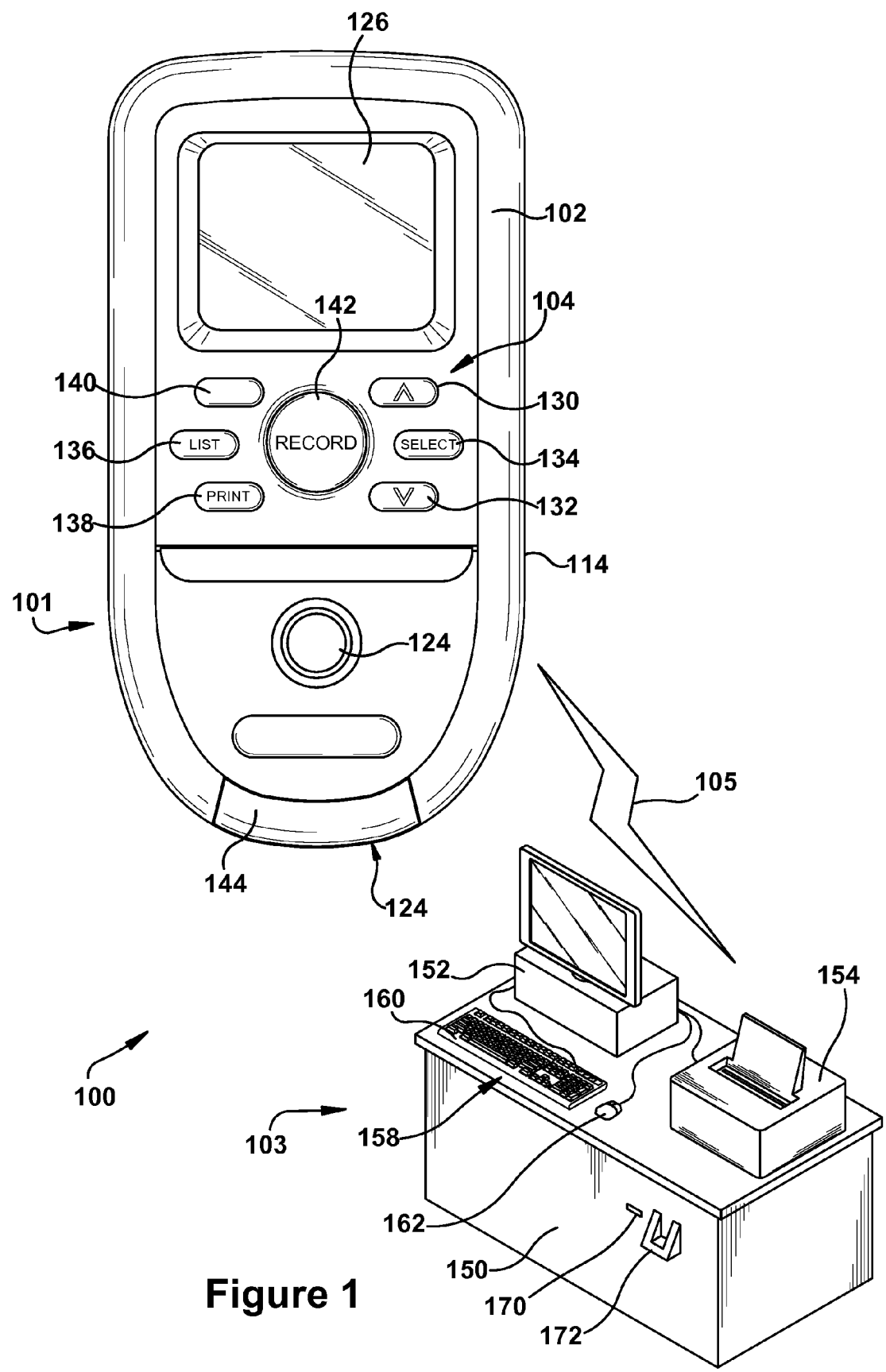
FIG. 1 is a diagram illustrating a system for automated compiling and generating categorized item list information including a portable handheld electronic device and a stationary kiosk device in accordance with an example embodiment of the present invention.
Figure 2:
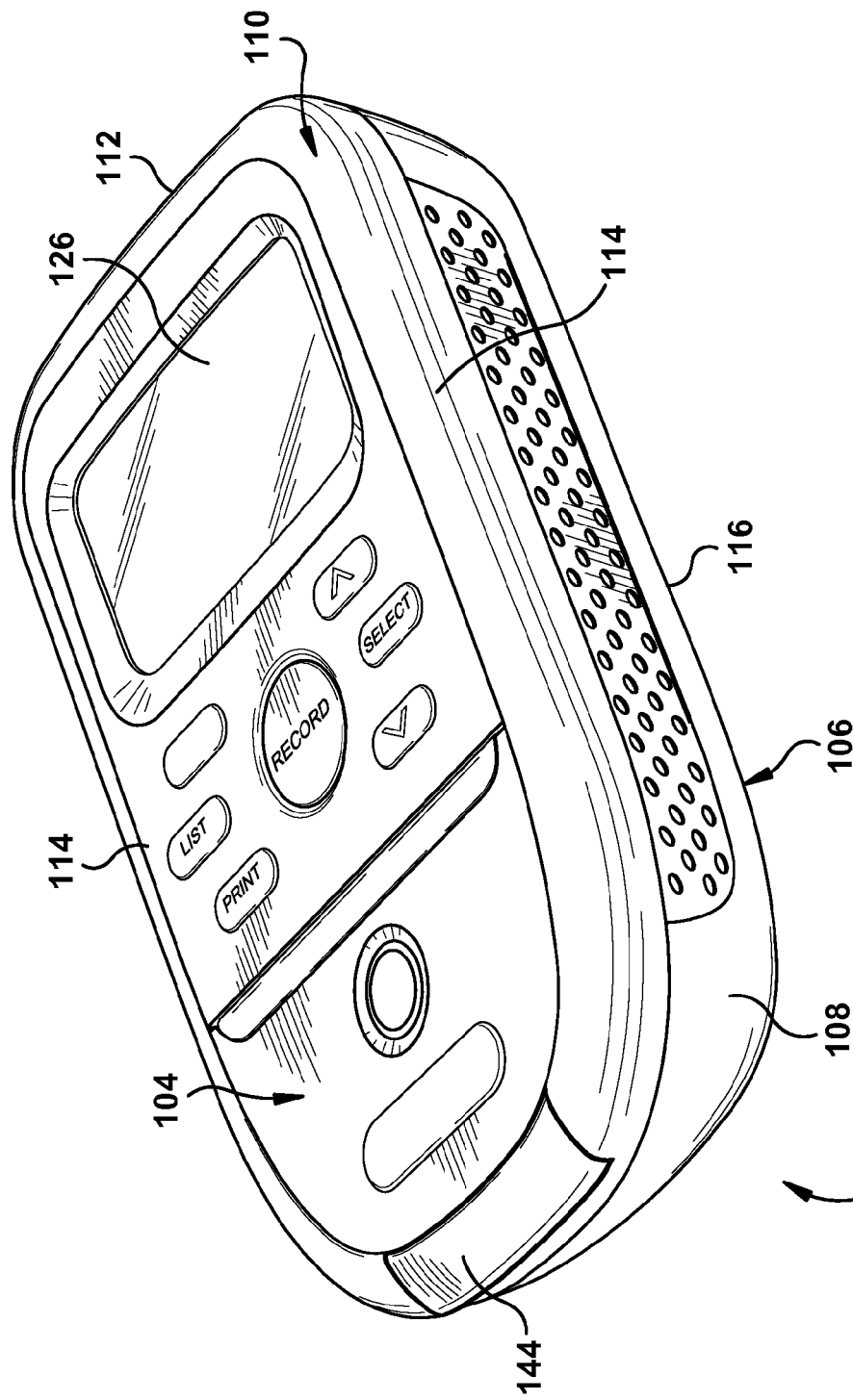
FIG. 2 is a perspective view of the portable handheld electronic device of FIG. 1 showing a preferred overall shape of the housing in accordance with an embodiment of the present invention.
Figure 11:
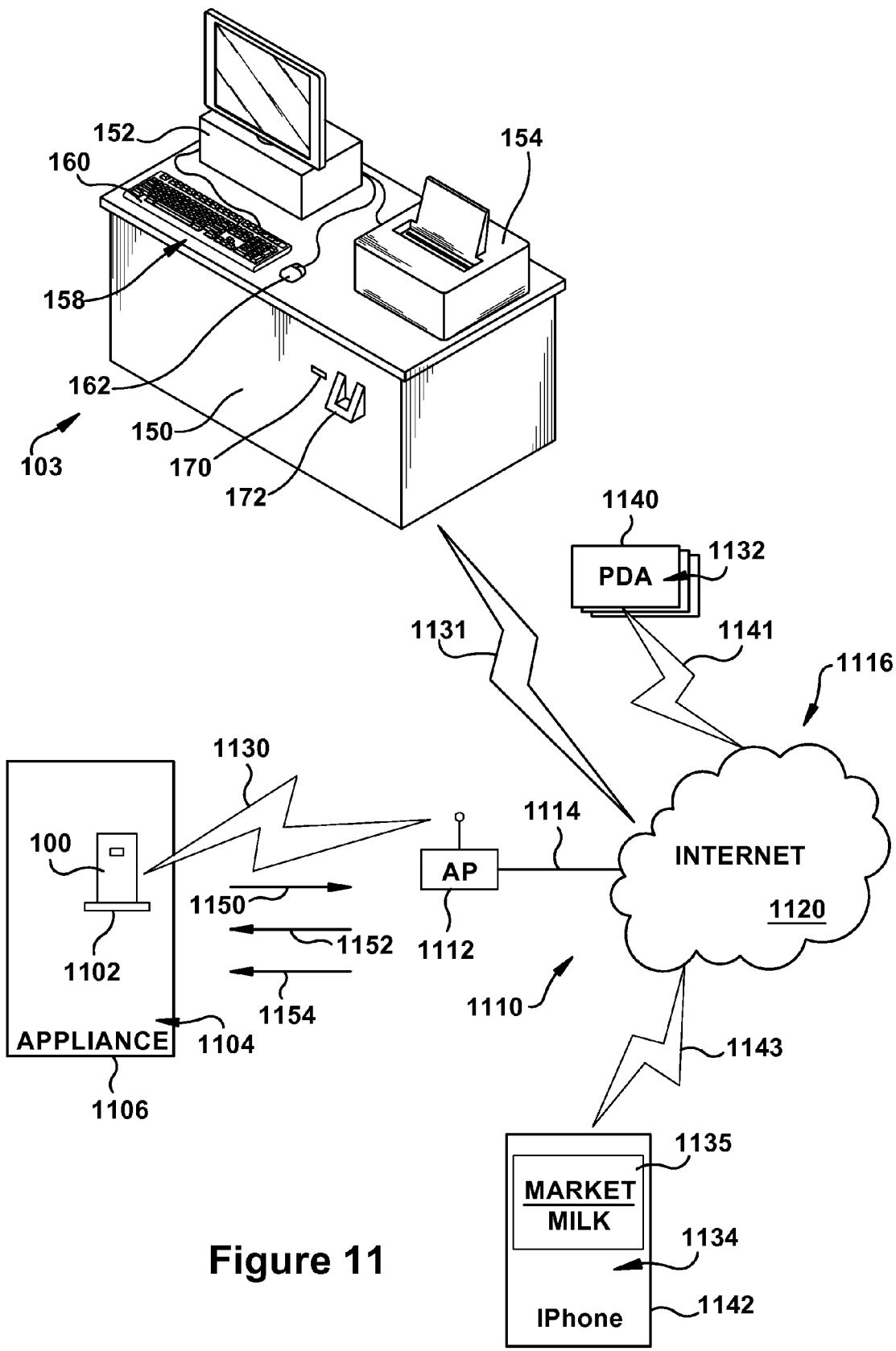
FIG. 11 is a diagram illustrating the portable device of FIGS. 1 and 2 in operation with networked devices in accordance with a further embodiment; and, FIG. 12 is a flowchart illustrating a method of operating the portable device with the networked devices of FIG. 11.
Figure 12:
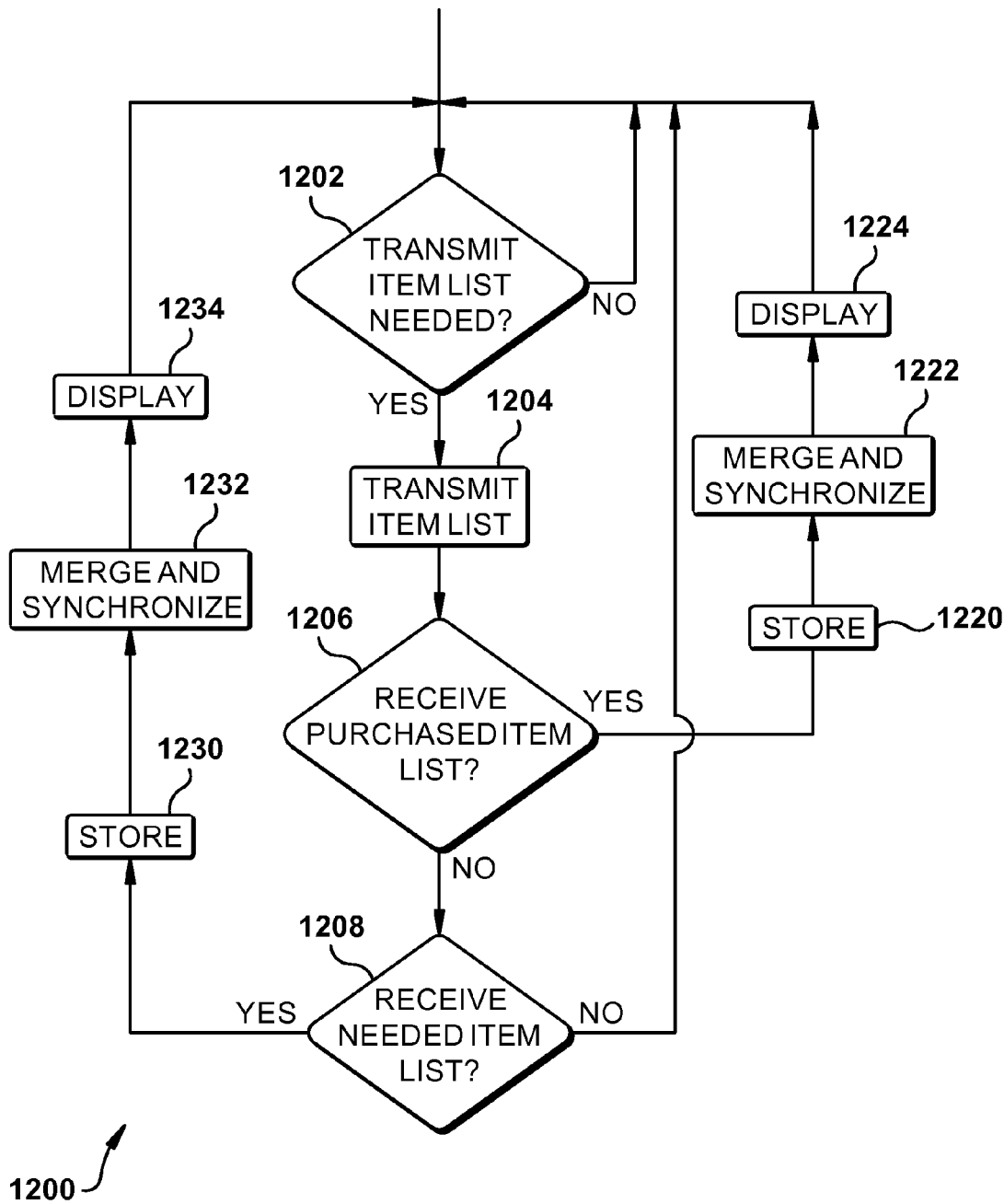

It will become apparent to those skilled in the art that the system, method, and portable handheld device and kiosk described herein are suitably adapted to a plurality of varying applications including, for example and without limitation, consumer use, office management, business-to-business management, restaurant management, and the like. The preferred portable device embodiment, as depicted in FIGS. 1 and 2, illustrates a portable handheld device for example purposes only and is not a limitation of the subject invention solely to such devices. For example, FIGS. 11 and 12 illustrate an embodiment wherein the portable handheld device may be used in a cradle affixed to an appliance, wherein the device is in operative communication with one or more networks and/or electronic handheld information devices, such as personal digital assistant devices (PDA devices or the like. A further embodiment includes an application downloaded into and executed by any generic electronic device including a smart phone such as, for example, an iPhone™ or any other similar device or system.

Referring now to FIGS. 1 and 2, there is shown a first preferred embodiment of a system 100 for automated compiling and generating categorized item list information including a portable electronic device 101 and a stationary kiosk device 103 in accordance with an example embodiment of the present invention. The portable electronic device 101 and stationary kiosk device 103 are in one embodiment operatively coupled by a wireless signal 105 which may be a radio frequency signal such as Bluetooth, an infrared IR signal or any other form of wireless data transmission. The portable electronic device 101 is illustrated in FIG. 1 as a handheld device including an outer housing 102. In accordance with the illustrated embodiment, the housing 102 of the portable electronic device is, preferably, constructed of a suitable plastic or lightweight metal material and has an overall truncated wedge shape as best shown in FIG. 2. When lightweight metal is used, preferably, the housing 102, or outer portion of the device is advantageously covered in a dielectric membrane, as will be known in the art. Preferably, the color of the device is selected by the user so as to match the appliances of the home in which the device will be used. It will be appreciated by those skilled in the art that suitable colors include, but are not limited to, black, white, almond, stainless steel (graphite), and the like. In a preferred embodiment, the device is capable of being affixed to a horizontal surface, such as a countertop, a vertical surface, such as a wall, or a household appliance, such as a refrigerator (not shown in the drawing). Means for securing the device mounting include, but are not limited to, adhesives, magnets, screws, and the like. Preferably, the mounting is accomplished with a separate mounting bracket, which is secured to the mounting surface and which is capable of receiving and holding the device. The mounting of the device to an appliance such as to a refrigerator, for example, is beneficial such as in the embodiment shown in FIGS. 11 and 12.

In the embodiment illustrated, the kiosk device 103 includes a generally stationary base 150 for positioning the kiosk device 103 at suitable positions at selected locations such as for example at retail outlets, in malls, at gas stations, or at any indoor or outdoor location. Although the device 103 is referred to as a "kiosk" and as being stationary it is to be understood that other embodiments are included and the illustrated embodiment is only an example. To that end the device 103 may include a base on wheels, a specially configured printer or printer system, or it may include a set of networked devices disposed at a location such as a mall wherein multiple receivers and print output devices are conveniently located throughout the mall for shoppers using one or more portable handheld devices 101. In the example embodiment illustrated, the kiosk device 103 includes a generally stationary base 150 supporting a computing processor 152 operable with a printer 154, display device 156, and data input means 158 including a keyboard 160 and mouse 162. In addition, the computing processor 152 is configured for operation with a data port 170 and a cradle 172 wherein the data port and cradle provide data exchange interfaces with the portable device 101. The data port 170 may be a USB interface for connection with the portable device 101 using a suitable cable, for example. The cradle 172 may provide a docking station connection between the portable device 101 and the computing processor 152. In addition, the kiosk device 103 is operatively coupled with the portable electronic device 101 by a wireless signal 105 using suitable hardware and software to be described in greater detail below.

As noted above, the housing 102 of the portable device 101 has an overall truncated wedge shape shown best in FIG. 2. In that form, the subject portable device 101 is easily held by the hand of the user for carrying the device. The shape of the device 101 is particularly advantageous during use of the device wherein the rear portion of the housing may be securely received and seated in the palm of the user's first hand while the thumb and fingers of the user's first hand may grip opposite sides of the housing so that the other hand may be used to interface with buttons on the device in a manner to be described in greater detail below.

Preferably, in the example embodiment illustrated, the housing includes spaced apart front 104 and rear 106 wall portions and a side wall portion 108. The side wall portion 108 connects a first outer edge 114 of the front wall portion 104 with a first outer edge 116 of the rear wall portion 106. In its preferred form as illustrated, the side wall portion 108 is a continuous wall connecting the front 104 and rear 106 wall portions wherein an internal space or cavity is defined and provided within the housing 102 for holding various electronic, power storage, and other components of the subject portable electronic device 101.

In order to provide the desired truncated wedge shape to the housing 102 of the subject portable device 101, the general shapes of the outer edges 114, 116 of the front 104 and rear 106 walls, respectively, bear a predetermined relationship. To that end, as best shown in FIG. 1, the first outer edge 114 of the front wall portion 104 has a generally rectangular shape, but with a smoothly curved lower portion 124. In addition, as shown best in FIG. 2, the first outer edge 116 of the rear wall portion 106 has a generally rectangular shape as well, and also includes a smoothly curved lower portion 126 substantially corresponding to the curved portion 124 of the front wall portion 104.

By comparison, the generally rectangular shape of the front wall portion 104 defined by the outer edge 116 thereof, is slightly larger than the generally rectangular shape of the rear wall portion 106 defined by the outer edge 116 thereof. In that way, the housing may take on a generally truncated wedge shape making it inherently very easy to hold by hand. In that regard, the side wall portion 106 is held at a predetermined relationship or angle relative to the front and rear wall portions 104, 106. Preferably, the side wall portion 106 is disposed at a selected predetermined acute angle relative to a back side (inner side relative to space defined in the housing) of the front wall portion 104, and is disposed at a selected predetermined obtuse angle relative to a front side (inner side relative to space defined in the housing) of the rear wall portion 106.

In order to further enhance the grip-ability of the subject portable electronic device 101, selected areas or regions of the side wall portion 106 may be coated, covered, bonded, or otherwise provided with a surface for promoting the retention of the portable device 101 in the palm of the user while carrying the device, but particularly while using the device. Preferably, the side wall portion 106 defines a compressible outer surface 110 for adapting the handheld system 101 to be easily carried by the associated user. In one form, the compressible outer surface 110 includes a textured rubberized material 112 defining grip panels 112 in a spaced apart relationship along the side wall portion 106. In the embodiment illustrated, the grip panels 112 are shaped substantially as rectangles and are disposed on opposite sides of the portable electronic device 101 in a manner to be easily engagable by the opposing thumb and fingers of the user of the device.

The grip panels 114 may include a texture design 118 such as shown and are preferably relatively soft and made from a material having a Shore hardness within a durometer range selected to provide a secure and comfortable grip for human users when holding or operating the device in use in various applications and in various environments. In addition, the grip panels 114 may be formed as a single unitary panel completely circumscribing the housing 102 such as by overmolding the grip panel onto the side wall portion 106 or by stretching and placing a member formed of a resilient material onto the housing 102 in the region of the side wall portion 106.

Figure 3A:
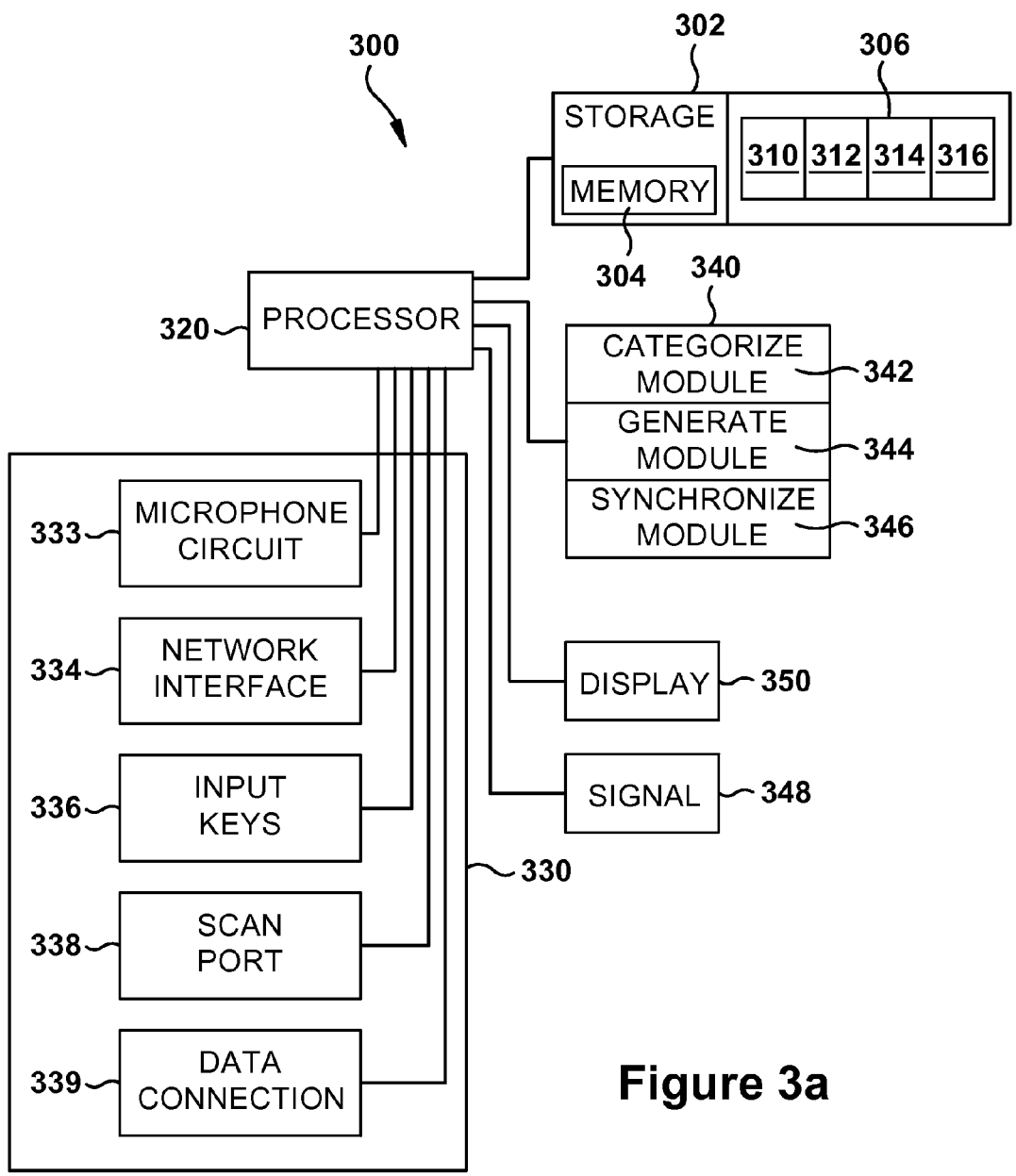
FIG. 3a is a schematic circuit diagram of an embodiment of the portable handheld device of FIGS. 1 and 2.

As shown in schematic form in FIG. 3a, the portable electronic device 101 includes an electronic circuit 300 having storage means 302, such as internal executive electronic memory 304, so as to retain an operating system, list data, application-related instructions, voice recognition software, and the like (not shown in detail in the drawing) and an internal data memory 306 configured to store application related data in portions thereof including a first portion 310 for storing assortment data, a second portion 312 for storing category data relating to categories assigned to the assortment data a third portion 314 for storing brand data relating to specific sources or origin for selected assortment data items such as a manufacturer or a vendor, and a fourth portion 316 for storing coupon data relating to price discounts for selected assortment data items.

Suitable executive memory 304 includes non-volatile memory, flash memory, optical memory, or any combination thereof, and the data memory 306 may include both volatile (RAM) as well as non-volatile memory of the type noted, or any combination thereof. Preferably, the device also includes a microprocessor 320 suitably adapted to facilitate operation of the device in accordance with the methods described herein. Suitable operating systems include, but are not limited to, Windows-based systems, Palm-based systems, RIM-based systems, Linux-based systems, and the like. The device further includes a user input circuit 330 configured to receive input data, commands, and the like from an associated source such as, for example, from users of the device or from an associated electronic device in communication with the circuit 300 such as, for example, through a network connection or the like. A verbal data input 332 comprising an integrated microphone circuit 333 (FIG. 1-104), suitably adapted to receive voice communications from an associated user. Voice communications are suitably processed, via the processor 320, using voice recognition software stored in the storage means 302 and/or in one or more of the memories 304, 306 so as to generate an electronic item for storage on the device memory. The processor further includes the ability to organize, compile, and generate a categorized item list in accordance with user-defined or other preferences or parameters using a list generator module 340. The compiling and generating module 340 includes a categorizing portion 342 adapted for associating categories to items in assortment data corresponding to user-selected items received into the system from a user of the system, a list generator portion 344 configured for compiling and generating item list information representative of the received assortment data in accordance with assigned category data, and a synchronizing portion 320 configured to synchronize one or more item lists such as from one or more users of the system for example into a synchronized or composite list to coordinate, for example, the several lists. In one example embodiment, the list generator 344 is operable to compile a plurality of user selected items specified during each of a plurality of transactions of the user operating the device and to generate categorized item list information representative of each of the user selected items categorized in accordance with an assigned category thereof such that at least two of the user-selected items are listed contiguously and associatively with a corresponding category.

The portable electronic device 101 also includes a display circuit 350, such as a backlit LCD display 126 (FIG. 1), a touch screen display, and the like. The display 126 is capable of illustrating to the user those items stored in memory, as well as enabling the user to select options and settings, as will be appreciated by those skilled in the art. To facilitate data entry and user selection, in addition to the integrated microphone 124 (FIG. 1), the portable electronic device 101 of FIGS. 1 and 2 further includes tactile input keys, such as for example and without limitation, scroll keys 130, 132, a select key 134, a list key 136, a print key 138, a timer key 140, and the like. To facilitate data entry and user selection, in addition to the integrated microphone 124, the portable electronic device 101, as illustrated in FIGS. 1 and 2, further includes tactile input key, such as for example and without limitation, a "Record" key 142. Those skilled in the art will appreciate that each tactile input key is advantageously programmed to reflect a function of the device. The input keys are illustrated in the schematic circuit of FIG. 3a at 336.

The device further includes data connection circuit means 339 (FIG. 1-144), such as a universal serial bus (USB) port, a wireless communication port such as a Bluetooth, 802.11, WiFi or infrared port, and/or an IEEE 1394 (Firewire) port, and the like, so as to enable the device to save and/or communicate data to an associated user computer (not shown) or with the kiosk device 103 (FIG. 1), receive updates therefrom, to receive data to improve voice recognition, to transfer data to and receive data from an associated device such as an access point (AP) or a personal digital assistant (PDA), or network such as a wired or wireless network, the Internet, or any combinations thereof. To facilitate output of categorized item list information generated of the items stored in the device memory, the portable electronic device 101 may in one embodiment incorporate an integrated printing engine (not shown). Preferably, however, the device 101 is communicatively coupled with the kiosk device 103 whereat any desired hard copy outputs may be generated using the printer 154 thereat, and whereat any human readable displays may be generated using the display device 156 at the kiosk 103. The printing engine is capable of outputting a hardcopy of the list via the kiosk device 103 so as to enable the user to print a copy of the list and leave the device securely affixed to the cradle 172, attached with the port 170 or while free roaming near the kiosk 103 by transmitting the data via a wireless signal 105. The data connection circuit means 339 (FIG. 1-144) may be used to communicate data from the memory 302, 304, and 306 to an operatively associated external processing device (not shown) such as, for example, an operatively associated cellular telephone device and/or an operatively associated retail establishment having corresponding communication capabilities and/or any other network or device.

In addition, an embodiment of the circuit 300 of the system includes a network interface circuit 334 configured to communicate with an associated network by the data connection circuit 339 coupled with an operatively associated external processing device (not shown) using a connection of the operatively associated external processing device with the associated network. Thus, the subject system may use an associated internet enabled device such as a cellular phone, for example, to access the Internet network for receiving promotion data, brand recommendation data, sales coupons, or the like. Also, the circuit 300 includes a signal generating circuit 348 operable to selectively generate wireless signals for communication with a corresponding circuit at the kiosk. The signal generating circuit 348 in the example embodiment is configured to generate radio frequency RF signals using the Bluetooth specification, but it may also take other forms such as for example infrared IR or any other wireless communication formats or standards.

Still further, a scan port 338 is provided for enabling the circuit 300 to receive scan data such as from, for example, a bar code scanner or the like. The scan port 338 may be provided with full scanner capability and functionality and in an embodiment may include a scanner device integrated into the circuit 300 of the portable handheld device 101. The scan data may include data obtained from UPC codes on products such as items in a store for example and may include data received from discount product coupons. Users of the system may scan products as they are depleted during use wherein the product information contained in the scan data is added to a shopping list of items to be purchased at a later date. Further, users of the system may scan products as they are purchased during a shopping trip wherein the product information contained in the scan data is removed from the shopping list of items to be purchased. Still further, users scanning coupons and products are alerted by a signal from the system, such as by a message on the display, when information from a scanned product matches one or more of the previously scanned coupons processed by the user whereby the user may be reminded to present the coupon at checkout.

In one embodiment, the portable electronic device 101 employs rechargeable batteries, as are known in the art, suitably recharged via the data connection means, or alternatively via a docking station (not shown). Those skilled in the art will recognize that the portable electronic device 101 is capable of being implemented with non-rechargeable batteries, such as AA batteries, and the like.

Figure 3B:
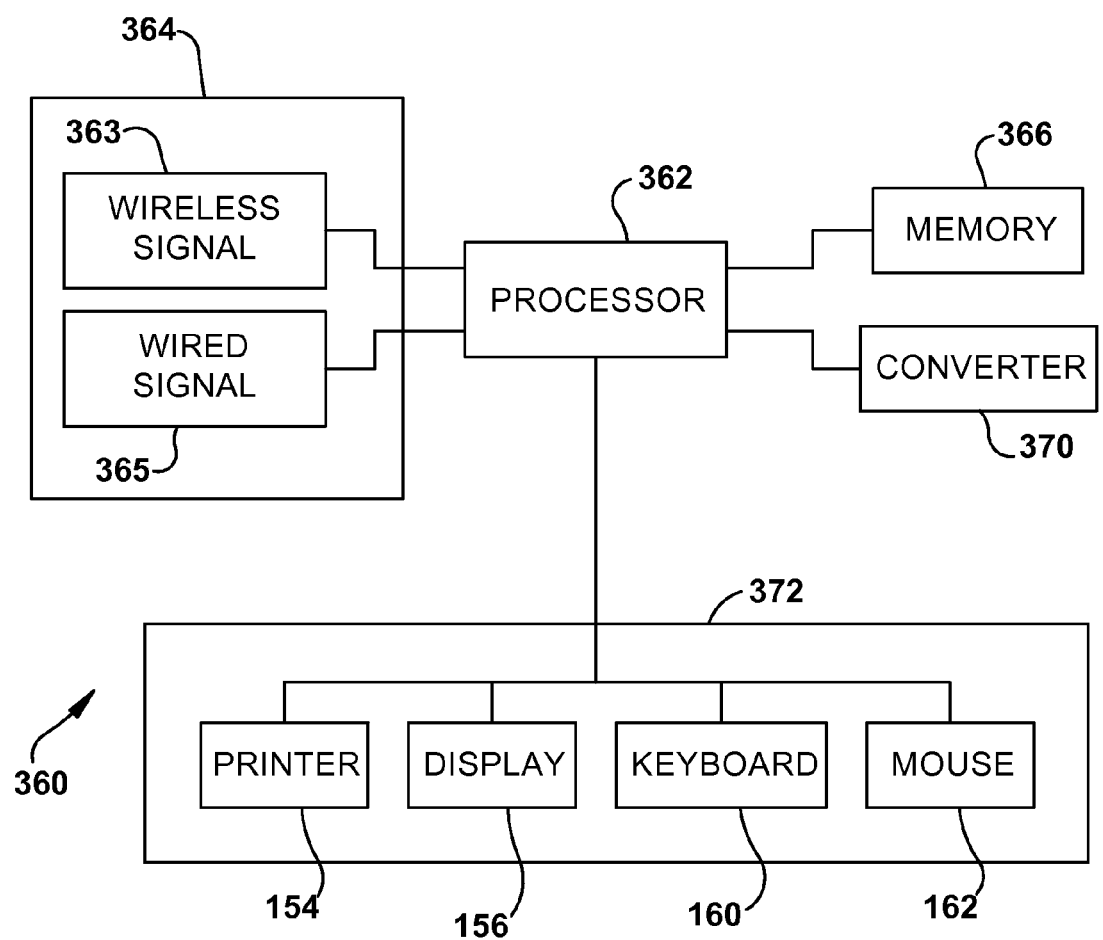
FIG. 3b is a schematic circuit diagram of an embodiment of the stationary kiosk device of FIG. 1.

As shown in schematic form in FIG. 3b, the stationary kiosk device 103 includes an electronic circuit 360 having a processor 362, a signal receiving circuit 364 including a wireless signal receiving circuit 363 in operative wireless communication with the signal generating circuit 348 (FIG. 3a) of the portable device 101 and a wired signal receiving circuit 365 in operative wireless communication with the data connection circuit 339 of the portable device 101, a storage memory 366, a convertor circuit 370 operable to generate received categorized item list data in accordance with one or more item list signals received by the signal receiving circuit 364, and a human user interface 372 operable to generate a human readable display representative of the categorized item list information in accordance with the received categorized item list data. The human user interface 372 includes printer 154, display device 156, and data input means 158 including a keyboard 160 and mouse 162.

In one example embodiment, basic operation of the portable electronic device 101 shown in FIGS. 1 and 2 commences by an associated user selecting the record key 142 of the device 101. When the associated user desires to input verbal data in a form of voice data to identify user-selected items for compiling and listing in accordance with an embodiment, the associated user, after selecting the record key 142, speaks an item the user desires to add to the list. For example, items suitably include, but are not limited to, food, tasks, errands, household parts, and the like. The voice recognition software recognizes the voice communication from the associated user via the integrated microphone 124 and converts the communication to computer-readable format, such as a text file, or the like. Suitable commercially available voice recognition software includes, but is not limited to, the VoCon® 3200 Embedded Development System v.2.0, from ScanSoft, Inc., and the like. The entered item is then stored in the list, which is organized, or categorized and listed by the module 344, in accordance with a predefined and/or a user-defined overall organization, such as for example, and without limitation, by type of item, by date entered, in alphabetical order, any combination thereof, and the like. In an embodiment, although the predefined overall organization list may be used, a user-defined category may be used as well to categorize the items in the list when the user-defined categories may include a sales outlet name such as a name of the retail store, a sales outlet type such as "hardware store," a location within a sales outlet such as "isle six," or a designation of a user of the device such as "Bob's list" or Mom's list." The item is then displayed on the display screen 126, preferably in one embodiment together with the predefined or user-defined category data. When the item or category data is incorrect, the associated user is able to delete the item and try again by selecting the item via the microphone 124, via scroll keys 128 or touchscreen interface, which the device may advantageously include, and delete the item using a delete key. A skilled artisan will understand that all items are capable of being deleted, if requested so. In one embodiment, the user's selected items are drawn from a predetermined "generic" list of available user-selectable items previously stored in the memory 306. In another embodiment, the desired item is not available form among the generic selectable set wherein the user may use the input circuit 330 to add, as necessary or desired, user-defined assortment data to the set of the "generic" list of available user-selectable items previously stored in the memory 306. In that way, for example and as will be described below with reference to FIG. 4, the memory 306 of the device is configured to store default or generic assortment and category data sets of information, as well as default or generic user defined assortment and category data sets.

Similarly, when the user desires to print the item list, such as for example at the kiosk device 101, the user selects the print key 138 and the item list is first transmitted by either the data connection 339 if the portable device 101 is in the cradle 172 or connected with the data port 170 or by the signal generating circuit 348 if the portable device 101 is free roaming relative to the kiosk. Thereafter, the item list is output via the display device 156 in the form of a human readable visual display or onto hard copy using the printing device 154 of the kiosk 103. Suitable printing means included ink-based printing, laser/toner-based printing, thermal-image printing, and the like. Those skilled in the art will appreciate that the type of printing used is dependent upon the device capabilities, thus when the device is configured, in accordance with one embodiment, with a thermal printer, thermally-activated paper is used. Likewise, when ink-based printing is used, regular paper, such as a calculator roll, is capable of being used to output the list. Preferably, the printer device 154 includes a serrated portion, advantageously located near the output of the printer to facilitate the removal of the hardcopy list. As will be understood by a skilled artisan, the item list is capable of being printed by an associated printer or by a printer associated with a desired remote computer other than the computing processor 152 of the kiosk device 103 by outputting the item list to the respective computer.

When a user desires to input assortment data in a form of alphanumerical data, the data connection means 114 may be connected with an associated alphanumerical data entry pad (not shown). Then the device operates similarly to that as when the voice data input is used. A skilled artisan will appreciate that a quantity of desired items is also capable of being similarly designated by the user using voice data input or alphanumerical data input. Those skilled in the art will recognize that a coupon for any item added to the list is capable of being suitably designated in a similar manner.

In a preferred embodiment, the device is capable of being advantageously provided with suitable settings for the microphone performance and for the LCD display contrast, such as "low", "medium", and "high" (not shown in the drawing).

As will be appreciated by those skilled in the art, typical voice recognition software uses preloaded master databases, which in accordance with the subject application is capable of including several thousands of items. However, a skilled artisan will understand that the system, method and device of the subject application allow for the user to easily add unique items or brands using voice data input through the microphone 104 or alphanumerical data input through the data connection means 114. Similarly, unwanted items are capable of being deleted from the master database. In a preferred embodiment of the subject application, the recognition rate is as high as 98%.

Figure 4:
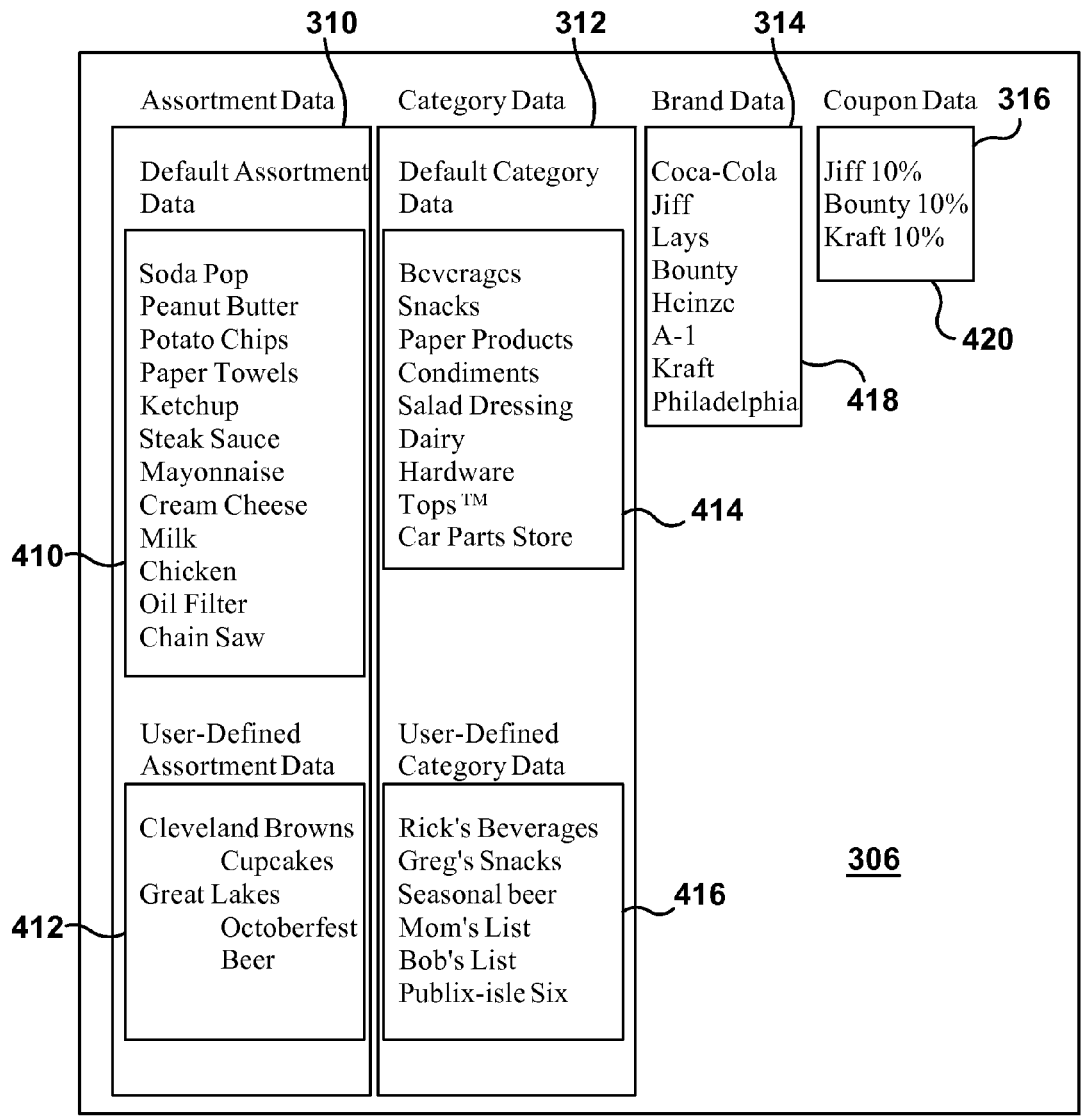
FIG. 4 is an illustration of a memory layout and includes representative data entries in accordance with an example embodiment.

Sets of default and user-defined assortment data, sets of default and user-defined category data, a set of brand data, and a set of coupon data in accordance with an example embodiment are shown in FIG. 4. As noted above, in the example, the first portion 310 of the memory 306 is configured to store assortment data and, further, stores default assortment data in a portion 410 thereof, and user defined assortment data in another portion 412 thereof. In the illustrated example, the default assortment data in the memory portion 410 includes data noted as soda pop, peanut butter, potato chips, paper towels, ketchup, steak sauce, mayonnaise, cream cheese, milk, chicken, oil filter, and chain saw. These are examples of assortment data previously stored in the generic set of items and therefore readily available to the user using the device 100 in an original or default condition. Further, the user-defined assortment data in the memory portion 412 includes data noted as Cleveland Browns Cookies, and Great Lakes Oktoberfest beer. These are examples of assortment data not available in the generic set of items and therefore defined by the user. Still further in the illustrated example, the default category data in memory portion 414 includes data noted as beverages, snacks, paper products, condiments, salad dressings, dairy, hardware, Tops, and car parts store. These are examples of category data previously stored in the generic set of items and therefore readily available to the user using the portable device 101 in an original or default condition. Further, the user-defined category data in the memory portion 416 includes data noted as Rick's beverages, Greg's snacks, seasonal beer, mom's list, Bob's list, and Publix-isle six. These are examples of category data not available in the generic set of items and therefore defined by the user. Yet still further, the third memory portion 314 includes an area 418 configured to store brand data therein. In the illustrated example, the brand data includes Coca Cola Products, Jiff, Lays, Bounty, Heinz, A-1, Kraft, and Philadelphia. Lastly, the fourth memory portion 316 includes an area 420 configured to store coupon data therein. In the illustrated example, the brand coupon data includes 10% Jiff, 10% Bounty, and 10% Kraft. However, other coupon data may include information on close out items or xx % off of certain selected or otherwise designated items.

Figure 5:
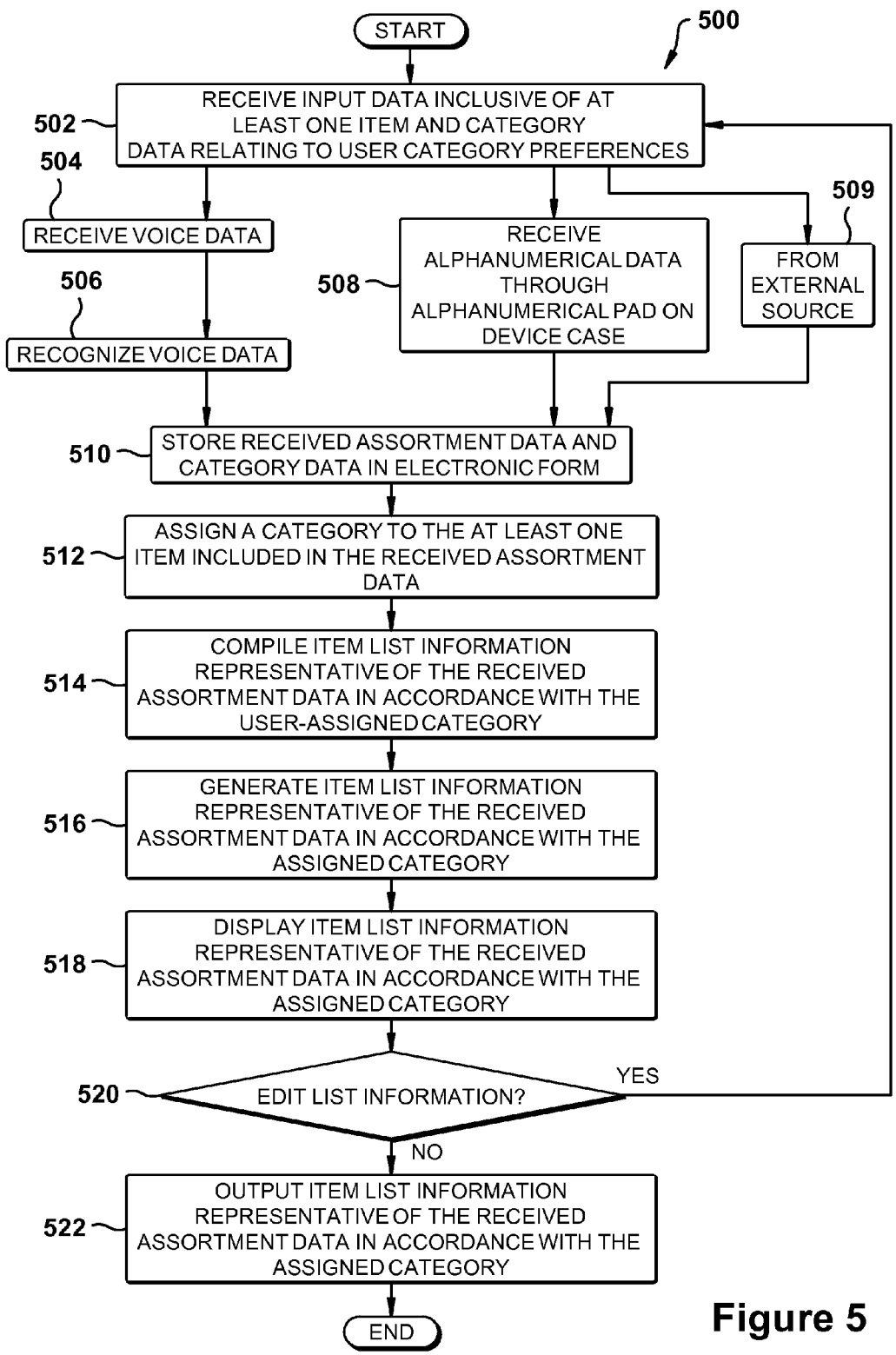
FIG. 5 is a flowchart illustrating a method for automated compiling and generating item list information according to an embodiment of the subject application as illustrated in FIGS. 1-3.

The foregoing system 100 illustrated in FIGS. 1, 3*a*, and 3*b*, will better be understood when viewed in conjunction with one example methodology or use of the device as set forth in FIG. 5. Turning now to FIG. 5, there is shown a flowchart 400 illustrating a method for automated compiling and generating item list information and synchronizing list information according to an example embodiment of the subject application. Beginning at step 502, the process of inputting data inclusive of at least one item and category data relating to user category preferences, is initiated by selecting the record key 142 of the device 100. Next, if the associated user desires to input the assortment data information in the form of voice or vocal data or commands, flow proceeds to step 504, in which verbal input specifying a user-selected item corresponding to at least one of the sets of assortment data 410, 412 is received from an associated user with the aid of the integrated microphone 124. The associated user speaks a desired item, which as mentioned above, is capable of suitably including, for example and without limitation, food, tasks, errands, household parts, and the like. At step 506 the voice recognition software recognizes the voice communication from the associated user and converts the communication to computer-readable format, such as a text file, or the like. As mentioned above, suitable commercially available voice recognition software includes, but is not limited to, the VoCon® 3200 Embedded Development System v.2.0, from ScanSoft, Inc., and the like. At step 510 assortment data corresponding to each of the plurality of user selected items is stored in electronic form by suitable storage means, as mentioned above.

If the associated user desires to input the user selected items in the form of alphanumerical data, flow from step 502 proceeds to step 508, in which assortment data inclusive of at least one item is received from an associated user with the aid of an associated alphanumerical pad (not shown).

If the associated user desires to receive input of the assortment data information in the form of data from an operatively associated external device such as, for example, a network or other device in communication with the user's device, flow from step 502 proceeds to step 509, in which assortment data inclusive of at least one item is received from an external associated electronic device with the aid for example of the data connection circuit 339 and/or the signal circuit 348. In an example embodiment, the assortment data received by the data connection circuit 339 and/or the signal circuit 348 may include a partial list of items to be added to a grocery list, it may include promotion data, brand recommendation data, or coupons. The data may be received from the kiosk device 103 as well. The received partial lists of items are synchronized with the one or more assortment data lists stored by the device.

At step 510 assortment data and category data received in the form of voice data, alphanumerical data, or data from an external associated device are stored in electronic form by suitable storage means, as mentioned above. The category data is stored in association with the assortment data.

After assortment data information specified by the user-selected items is retrieved from the generic assortment data memory portion 410 or from the user-specified portion 412, in response to input either in the form of voice data, or in the form of alphanumerical data, flow proceeds to step 512, at which a category is assigned to the at least one item included in the received assortment data by categorizing means. Those skilled in the art will appreciate that the categorizing means are capable of being implemented as a suitable processor known in the art (not shown in the drawing). As will be understood by a skilled artisan, the processor suitably includes the ability to organize and categorize items in accordance with user-defined preferences, such as for example, and without limitation, by type of item, by date entered, in alphabetical order, by a sales outlet name such as "Sears," by a sales outlet type such as "hardware store," by a location within a sales outlet such as "isle six," by a designation of a user of the device such as "Bob's list" or Mom's list," or by any combination thereof, and the like. Next, list information representative of the received assortment data in accordance with the assigned category, is compiled by the processor at step 514 and generated at step 516.

Figure 6:
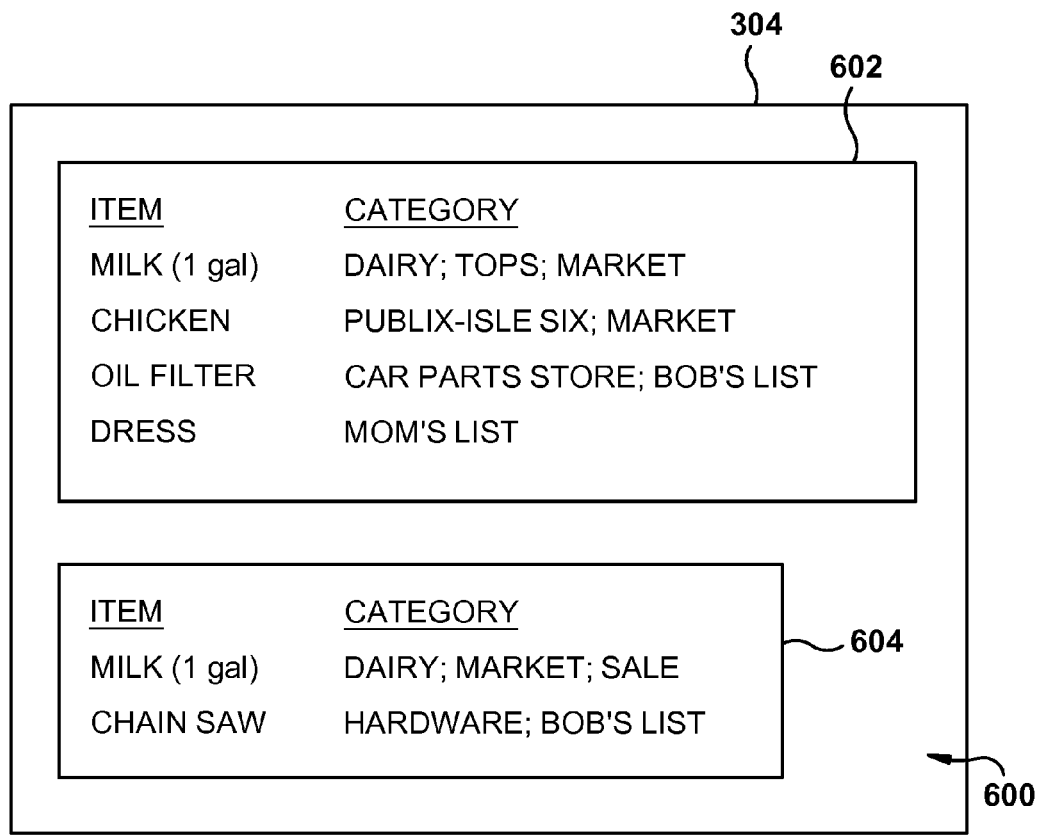
FIG. 6 is a diagram illustrating a pair of item lists stored in a memory of the device of FIGS. 1-3.

FIG. 6 illustrates list information 600 stored in a memory 302 of the example embodiment shown in FIGS. 1-3. The list information 600 includes a first item list information 602 and a second item list information 604. Each of the item lists may have been received into the system from a single user during a single input session or over multiple data input sessions, such as during a week period while consuming products at home for example. Further, the item lists may have been received into the system from multiple users.

The first item list information 602 includes items of milk (1 gal.), chicken, oil filter, and dress. User-selected categories are assigned to these items in accordance with the embodiments. For example, a product type category of "dairy" is assigned to the milk item, as well as a retail outlet name category of "Tops" and a retail outlet type category of "market." As shown by example, a location within a retail outlet category of "Publix isle six" is associated with the chicken item and a user's identification type category of Bob's list is associated with the oil filter item. Similar items and category types are associated with the items of the second item list information 604. In the example embodiment, as illustrated, the list generator module 340 is responsive to a list generation instruction and is operable to compile the plurality of user selected items specified during each of the plurality of transactions and to generate categorized item list information representative of each of the user selected items categorized in accordance with the assigned category such that at least two of the user-selected items are listed contiguously and associatively with a corresponding category.

FIG. 7a illustrates an item list 702 based on the first item list information 602 and generated in accordance with the user-selected category relating to a retail outlet type of the items in the item list 602. As shown, the item list 702 includes in the example the items organized by the user-defined category of retail outlet type including market and car parts store. From the first item list 602 of FIG. 6 it can be seen that the items associated with the user-selected category of "market" include milk and chicken. Similarly, from the first item list 602 of FIG. 6 it can be seen that the sole item associated with the user-selected category of "car parts store" includes oil filter.

FIG. 7b illustrates an item list 704 based on the first item list information 602 and generated in accordance with the user-selected category relating to an identification of the user providing the items in the item list 602. As shown, the item list 704 includes in the example the items organized by the user-defined category of user identification including "Bob's list" and Mom's list." From the first item list 602 of FIG. 6 it can be seen that the sole item associated with the user-selected category of "Bob's list" includes oil filter. Similarly, from the first item list 602 of FIG. 6 it can be seen that the sole item associated with the user-selected category of "Mom's list" includes dress.

The assortment data information received by alphanumeric means, by voice command means or by any other means may be merged with assortment data information received by the data connection circuit 339. The synchronizing circuit 346 is operative to merge first and second item lists and to synchronize the merged list in accordance with, for example, the user-defined categories, predetermined categories which may be integrated with the device, or any combination of those or other categories.

Figure 8:
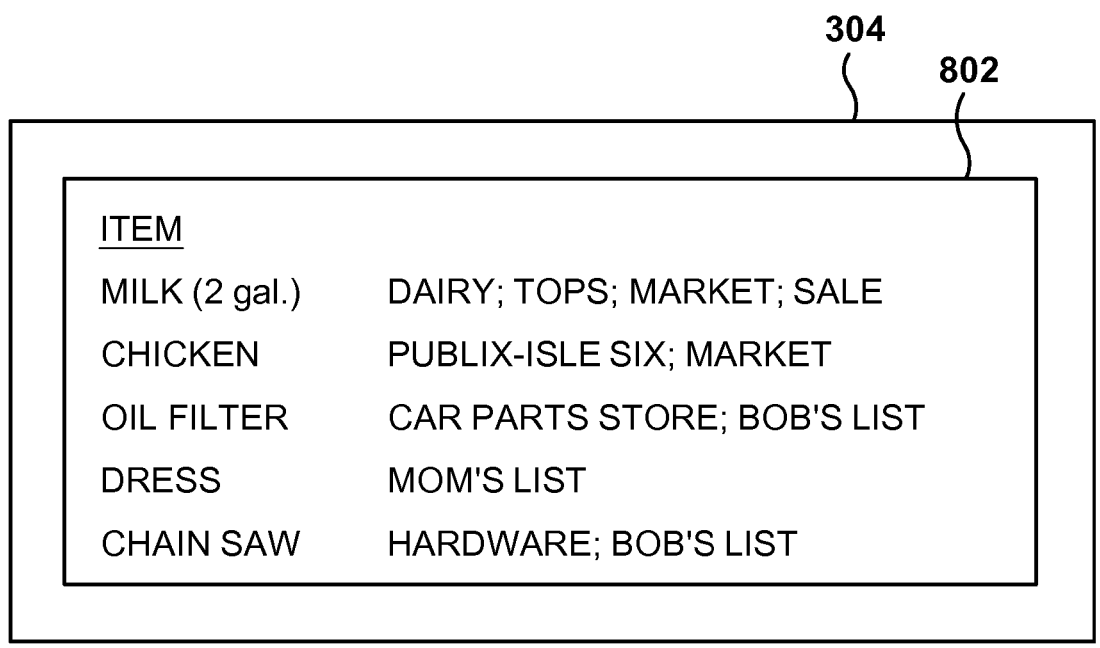
FIG. 8 is a diagram illustrating an item list generated in accordance with a merging and synchronizing of the pair of item lists of FIG. 5.

FIG. 8 illustrates by way of example an item list 802 based on a synchronization by the synchronizing circuit 346 of the first and second item list information portions 602 and 604. As shown, the lists 602 and 604 are merged and synchronized wherein redundant items may be aggregated and other items may be arranged in a fashion desired by the user. In the example, "milk" is found in both the first and second item lists and, accordingly, is aggregated in the composite item list 802 as "milk (2 gal.). In addition, the user-selected categories for the redundant item of milk in the first item list 602, namely the "dairy" Tops" and "market" are merged with the user-selected categories for the redundant item of milk in the second item list 604, namely the "dairy" "market" and "sale" in a manner to include all user-selected categories in the composite list 702.

With reference again to FIG. 5, at step 518, the display 126 displays list information generated at step 516. In the event that the associated user does not desire to edit list information, flow proceeds to step 522. At step 522 list information representative of the received assortment data in accordance with the assigned category, is suitably output. The list information is capable of being output at step 522 by suitably printing a hard copy of the list using an integrated printing engine (not shown), thereby selecting the print key 138.

Alternatively, at step 522 the list information is capable of being delivered to an associated computer, network, PDA, cellular phone device, hardwired printer, or to the printer 154 associated with the stationary kiosk device 103 by outputting the item list to the respective computer via suitable data connection means 144, such as for example, and not limited to, a universal serial bus (USB) port, a Bluetooth port, wireless communication port, WiFi port, infrared port, and/or an IEEE 1394 (Firewire) port. In one embodiment, the data connection circuits 339, 348 may be used to communicate the list information to the stationary kiosk device 103 or to an associated external device such as a wireless access point (AP), a network connected with the AP, a PDA or a cellular telephone device associated with the network, or to an associated external device at a retail establishment other than the kiosk 103 wherein the list information may be used by employees at the retail establishment to collect make ready merchandise before the customer arrives at the store.

In the event that the associated user does desire to edit the list information displayed by the display 126, flow returns to step 502 and further to step 504 and step 506, or to step 508. The associated user is now capable to add one or more items to the list, or delete one or more items, as well as delete the entire list, advantageously using scroll keys 130,132, the delete key, the clear key, or the microphone 124. As a skilled artisan will appreciate, after the list information displayed by the display 126 is edited, flow proceeds to step 510, and further as illustrated in FIG. 5, in the same manner as described above.

Figure 9:
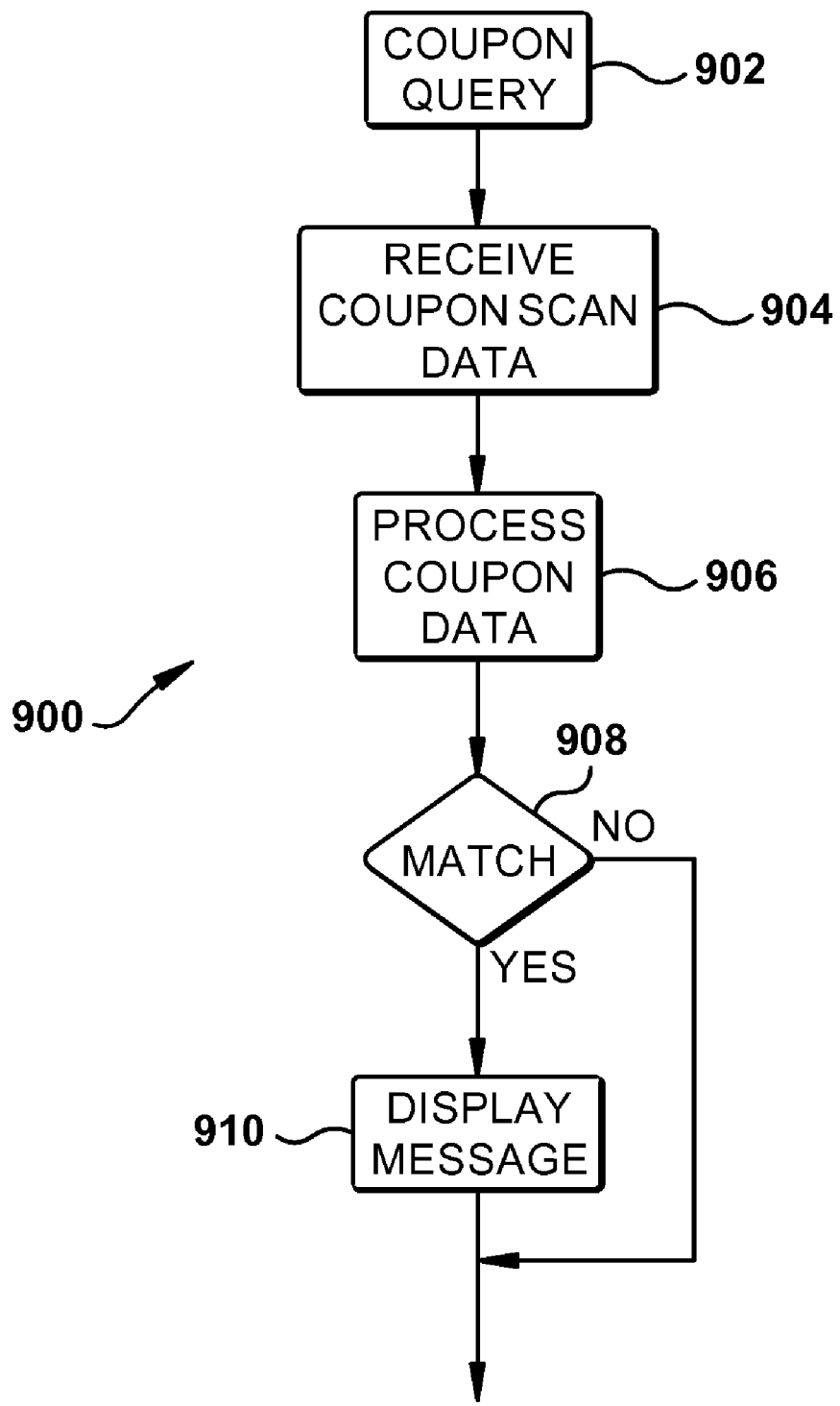
FIG. 9 is a flowchart illustrating a method for processing coupon data.
Figure 10:
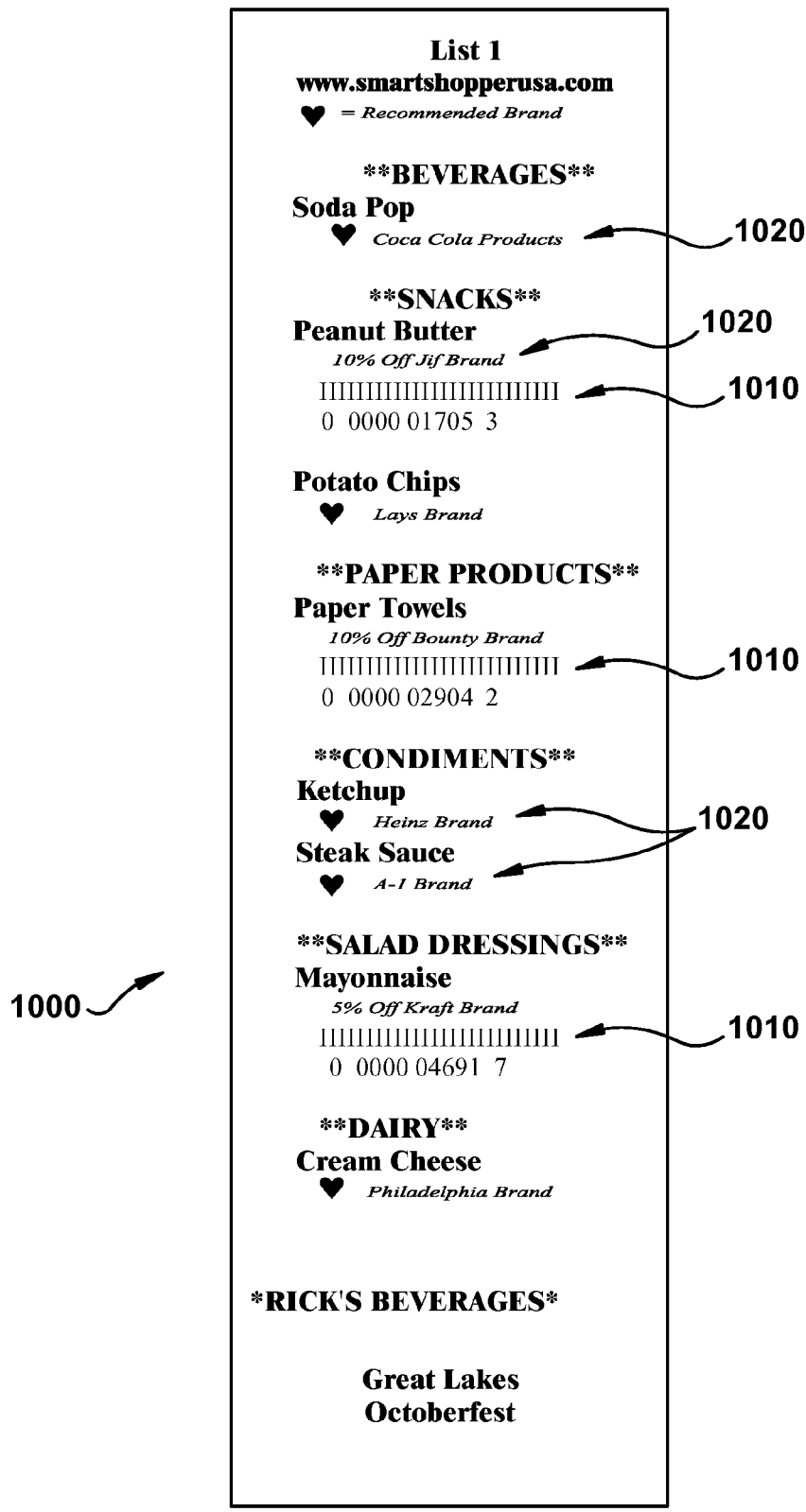
FIG. 10 is an illustration of a categorized list information including promotion data associated with selected user selected items.

Additional functionality of the subject system 100 is shown in FIGS. 9 and 10 wherein, with reference first to FIG. 9, a sale discount coupon processing method 900 is shown. In step 902, a user of the system may lodge a coupon query. The coupon query is, in one embodiment, a scan of a bar code contained on a sales discount coupon. In another embodiment, the user queries the external associated network by the data connection circuit 339 for initiating a search on the associated network for any sales discount coupons which may be available. In one embodiment, the user searches the Internet by the data connection circuit 339 for initiating a search of relevant coupon sites for any sales discount coupons. In a further embodiment, the user may query the kiosk device 103 for promotion data, close out item data, brand recommendation data and/or coupon data by using the wireless signal 105 when roaming relative to the kiosk or by the data port 170 or cradle 172 at the kiosk base 150 when convenient to the user. In yet a further embodiment, the promotion data, brand recommendation data and/or coupon data may be "pushed" out to the portable device 101 when it is in close proximity to the kiosk 103 or when coupled with the cradle 172 or data port 170. Also, the promotion data, close out item data, brand recommendation data may be simply displayed for viewing on the display device 156 or output as a tangible item using the printer 154.

The coupon data from step 902 is received into the system at step 904 and processed at step 906. In one embodiment, the processing includes a comparison of the coupon data with the list data in the memory of the system to determine if any of the items in the list data correspond to the sales discount coupons. When one or more of the list data items match one or more of the coupons based on a comparison 908, a message is generated at 910 to alert the user that a discount sales coupon is available for use in purchasing an item in the list data.

In another embodiment, the processing 906 includes a comparison of an expiration date component of the coupon data with the current and a predetermined time period set by the user of the system to determine if any of the sales discount coupons stored in the memory are soon to expire. When one or more of the sales discount coupons stored in the memory are set to expire within the predetermined time period set by the user based on a comparison 908, a message is generated at 910 to alert the user that a discount sales coupon is available, but will expire shortly.

It is to be appreciated that "coupon" is intended to include any promotional information or data such as, for example, brand recommendation data, sales discount data, rebate information, vendor discounts or other incentives, close outs, xx % off certain items, or any other information or data used for purposes of providing value to the user of the device such as product cost discounts or for assisting the user in making purchasing decisions based on marketing or other materials provided by vendors or manufacturers. Some specific examples of coupons in the form of brand data 418 and coupon data 420 are illustrated in FIG. 4 for example.

FIG. 10 illustrates an example of categorized list information 1000 in accordance with an embodiment. As noted above, the list generator 344 is responsive to a list generation instruction received from the associated user of the device 100 and is operable to compile the plurality of user selected items specified during each of a plurality of transactions and to generate categorized item list information representative of each of the user selected items categorized in accordance with the assigned category such that at least two of the user-selected items are listed contiguously and associatively with a corresponding category. Further, the list 1000 includes coupon data 1010 selectively representative of a promoted brand 1020 and promoted sales price discount 1030 assigned to the selected ones of the plurality of items included in the assortment data. In the example embodiment, the display 350 or other output means such as, for example, a printer or other hard copy generating device selectively generates, responsive to a selection input from a user, sales coupon data associated with the coupon data representative of the sales price discount. In particular, as shown in the example, the list 1000 includes generic or default assortment data of soda pop, peanut butter, potato chips, paper towels, ketchup, steak sauce, mayonnaise, and cream cheese. The list 1000 further includes user-defined assortment data of Great Lakes Oktoberfest beer. The generic or default assortment data of soda pop, potato chips, ketchup, steak sauce, mayonnaise, and cream cheese stored in the memory portion 410 (FIG. 4) in association with promotional brand data information stored in memory portion 418. Accordingly, the list information 1000 is generated in a manner that the promotional brand data is presented adjacent the corresponding one or more assortment data items. In the illustrated example, the assortment data of soda pop is associated in memory and listed with Coca Cola, potato chips with Lays, ketchup with Heinz, steak sauce with A-1, and cream cheese with Philadelphia brand.

Still further with reference to FIG. 10, the assortment data of peanut butter is associated in memory and listed with Jiff and, further, is associated with discount coupon data or 10% off the sales price as stored in association therewith in memory portion 420. Similarly, the assortment data of paper towels is associated in memory and listed with Bounty and, further, is associated with discount coupon data or 10% off the sales price as stored in association therewith in memory portion 420. Yet still further, the assortment data of mayonnaise is associated in memory and listed with Kraft and, further, is associated with discount coupon data or 10% off the sales price as stored in association therewith in memory portion 420.

Referring now to FIGS. 11 and 12, there is shown a further preferred embodiment of a system 100 including the portable electronic device 101 and stationary kiosk 103 in accordance with the present invention. A portable electronic device 101 such as the handheld device including an outer housing 102 as illustrated in FIG. 1 is mounted by a suitable bracket 1102 or the like to an associated appliance 1104, such as a refrigerator 1106 as illustrated. The mounting of the device to an appliance such as to a refrigerator, for example, is beneficial because in this position, all of the members of a family will likely be in close proximity and see or encounter the device whereby they may be reminded to use the device, preferably daily, to enter into or retrieve from shopping lists, notes, other information, or the like. Preferably, the color of the device is selected by the user so as to match the appliances of the home in which the device will be used. It will be appreciated by those skilled in the art that suitable colors include, but are not limited to, black, white, almond, stainless steel (graphite), and the like. In the further preferred embodiment shown, the device is capable of being affixed to a horizontal surface, such as a countertop, a vertical surface, such as a wall, or a household appliance, such as the refrigerator 1106. Means for securing the device mounting further include, but are not limited to, adhesives, magnets, screws, and the like. Preferably, the mounting is accomplished with a separate mounting bracket 1102 as shown, which is secured to the mounting surface and which is capable of receiving and holding the device 100.

As shown in FIG. 11, the portable device 101 as well as the stationary kiosk device 103 are in operative communication with a network 1110 including, for example a wireless access point (AP) 1112 connected by a connection 1114 shown schematically in the drawing as a line, with a larger network 1116 such as, for example, the Internet 1120. The network interface 439 (FIG. 4) of the portable device 101 is in operative wireless communication with the AP 1112 by a wireless data link 1130 and the kiosk device 103 in operative wireless communication with the network 1110 including the larger network 1116 and the Internet 1120 by a wired or wireless link 1131. Similarly, the network includes one or more electronic handheld information devices 1132, 1134 such as, for example, one or more personal digital assistants (PDAs) and one or more wireless cellular phones. In the example embodiment illustrated, the first electronic handheld information device 1132 is a PDA 1140 and the second electronic handheld information device 1134 is a cellular telephone 1142, preferably an iPhone™ for example. The PDA 1140 is inoperative communication with the network 1116 by a first wireless communication link 1141 and, similarly, the iPhone 1142 is in operative communication with the network 1116 by a second wireless communication link 1143.

As should be appreciated, the wireless access point 1112 is suitably disposed in near proximity to the portable device 101 and is sufficiently close and within range of the network interface 439 of the device to enable the device and the corresponding interface of the AP to mutually transmit, receive, and interpret signals for the other respective device. In accordance with an example, the portable device 101 is on a refrigerator 1106 in a kitchen of a residence and the AP 1112 is in a den, office, library or other region of the residence. The one or more electronic handheld information devices 1132, 1134 may be located anywhere in the world relative to the portable device 101 as they are connected wirelessly with the device via the intermediate network 1116, preferably the Internet 1120.

In the embodiment, illustrated, the portable device 100 is configured to transmit shopping or other list data 1150 shown schematically in the drawing as an arrow to the one or more electronic handheld information devices 1132, 1134 via the network 1116. This is useful for many reasons including for transmitting, updating or otherwise providing shopping list data to family members or the like while they are moving about mobile relative to the device on the appliance during their day to day activities. Further, the portable device 101 is configured to receive acquired shopping or other list data 1152 from the one or more electronic handheld information devices 1132, 1134 via the network 1116 indicating that one or more of the family members for example has purchased one or more of the items provided on an original shopping or other list 1152. Still further, the portable device 101 is configured to receive from the stationary kiosk device 103 either directly or through the network 1110, promotion data relating to discounted items or item groups or types of items, e.g. "fall clearance" at the location of the kiosk, brand recommendation data relating to items preferred for purchase at the kiosk location, e.g. Kraft Foods advertisements, and coupon data relating to discounts on specific individual items, e.g. 40% off the purchase of Great Value brand plastic bags, close out information, or xx % off certain selected items. The device is operative to merge or otherwise synchronize the received acquired shopping or other list data 1152 with the original shopping list data by deleting the acquired items from the list and updating the list such as in a manner described above for example. Still further, the device 100 is configured to receive shopping or other item needed data 1154 from the one or more electronic handheld information devices 1132, 1134 via the network 1116 indicating that one or more of the family members for example has determined a need for an additional item either not on the original shopping list or to be added as a further quantity to the original list. As an example, a member of the network may decide that 3 gallons of milk will be required rather than the 2 gallons as per the original item list. The device is operative to merge or otherwise synchronize the received acquired shopping or other list data 1152 with the original item list data by adding the necessary items to the list, such as in a manner described above for example followed by updating the list accordingly.

The updated shopping lists may be displayed on the portable device 101 as well as at the kiosk display 156 or printer 154 or on the one or more electronic handheld information devices 1132, 1134 such as shown at 1135 as necessary or desired. Further, the updated shopping list may be printed from device to provide a hard copy of the updated shopping list using the print key 138 as described above.

Referring now to operation of the portable electronic device 100 shown in FIG. 11, a method 1200 is shown in FIG. 12. In a first step 1202, a determination is made by the device whether a transmission of the shopping list or of an updated list to the one or more electronic handheld information devices via the network 1116 is necessary. When it is determined that a transmission is necessary, the item list is transmitted at step 1204 to the one or more electronic handheld information devices 1132, 1134 via the network 1116.

In step 1206, the portable device 101 is operative to determine whether any of the one or more electronic handheld information devices 1132, 1134 have transmitted, via the network 1116, a list of items purchased or of items to be removed from the list. When such a list has been received by the data connection means 339, item acquired list information representative of selected ones of the first item list information purchased by a user associated with the external portable processing device are stored at step 1220 in electronic form in the storage means 302 in the housing of the device 100. In step 1222, the generating means 344 in the housing compiles and generates second item list information representative of a merging of the first assortment data and the received item acquired list information by deleting selected items of the first assortment data in accordance with the received item acquired list information as second item list information. In step 1224, at least a portion of the second item list information is displayed on the display 350 of the portable device 101 or on the display 156 or printer 154 of the stationary kiosk device 103 in a merged format in accordance with the assigned first and second user-selected categories.

In step 1208, the portable device 101 is operative to determine whether any of the one or more electronic handheld information devices 1132, 1134 have transmitted, via the network 1116, a list of items to be added to the list. The portable device 101 is operative to determine whether the stationary kiosk device 103 transmitted either directly or through the network 1110, promotion data relating to discounted items or item groups or types of items, brand recommendation data relating to items preferred for purchase at the kiosk location, or coupon data relating to discounts on specific individual items. When such a list has been received by the data connection means 339 or by the signal port 348, item acquired list information representative of selected ones of the first item list information to be added are stored at step 1230 in electronic form in the storage means 302 in the housing of the portable device 101. In step 1232, the generating means 344 in the housing compiles and generates second item list information representative of a merging of the first assortment data and the received list of one or more items to be added by merging selected items of the first assortment data in accordance with the received added items list information as second item list information. In step 1234, at least a portion of the merged item list is displayed on the display 350 of the portable device 101 or on the display 156 or printer 154 of the stationary kiosk device 103 in a merged format in accordance with the assigned first and second user-selected categories.

The embodiments of the invention extend to computer programs in the form of source code, object code, code intermediate sources and object code (such as in a partially compiled form), or in any other form stored in a memory or other tangible storage means or device and suitable for use in the implementation of the invention. Computer programs are suitably standalone applications, software components, scripts or plug-ins to other applications and executable by a tangible machine or processor. Computer programs embedding the invention are advantageously embodied on a tangible carrier, being any entity or device capable of carrying the computer program: for example, a storage medium such as ROM or RAM, optical recording media such as CD-ROM or magnetic recording media such as floppy discs. Computer programs are suitably downloaded across the Internet from a server. Computer programs are also capable of being embedded in an integrated circuit or embodied in logic. Any and all such embodiments containing code that will cause a computer to perform substantially the invention principles as described, will fall within the scope of the claimed invention.

In addition, when the word "or" has been used herein in reference to a list of two or more items, that word covers all of the following interpretations of the word: any of the items in the list, all of the items in the list, and any combination of the items in the list.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for organizing a shopping experience of an associated user, the system comprising:
 a data input configured to receive, from the associated user during each of a plurality of transactions, first input specifying a corresponding plurality of user-selected items;
 a non-transitory data storage configured for storing generic assortment data corresponding to each of the plurality of user-selected items, the data storage further being configured for storing user-defined category data representative of item categories assigned by the associated user to selected ones of the plurality of items included in the generic assortment data, the user-defined category data comprising at least one of a user-defined sales outlet associated with a first set of the plurality of user-selected items, a user-defined location within a sales outlet associated with a second set of the plurality of user-selected items or a user-defined category naming designation associated with a third set of the plurality of user-selected items, the data storage further being configured for storing received brand data representative of item brand identifications associated with selected ones of the plurality of items included in the generic assortment data;
 a user input configured to receive, from the associated user, a list generation instruction; and,
 a list generator, responsive to the list generation instruction, configured to compile the plurality of user-selected items specified during each of the plurality of transactions and to generate categorized item list information including selected generic assortment data items representative of the user-selected items categorized in accordance with the user-defined category data such that the selected generic assortment data items representative of the user-selected items are listed contiguously and associatively with a corresponding user-defined category, and such that at least one brand identification is selectively listed in association with at least one corresponding generic assortment data item.

2. The system of claim 1, further comprising:
a human user interface configured to generate a human readable display representative of the user-selected items categorized in accordance with the user-defined category data.

3. The system of claim 2, wherein:
the data storage is configured for storing brand recommendation data as the brand data, the brand recommendation data being representative of brand preference information assigned to selected ones of the plurality of items included in the assortment data; and,
the human interface is operative for presenting to the associated user preferred brand information corresponding to the brand recommendation data.

4. The system of claim 3, wherein:
the data storage is configured for storing advertisement data as the brand recommendation data, the advertisement data being representative of a promoting vendor source assigned to selected ones of the plurality of items included in the assortment data; and,
the human interface is configured to present to the associated user advertised brand information corresponding to the advertisement data.

5. The system of claim 1, wherein:
the data storage includes a memory storing coupon data representative of pricing discounts assigned to a plurality of items associated with the selected ones of the plurality of items included in the assortment data; and,
the human interface is operative for presenting to the associated user coupons corresponding to selected coupon data in accordance with a predetermined discount price policy.

6. The system according to claim 1, wherein:
the data input is configured to receive second input specifying at least one specified item;
the list generator is configured to selectively synchronize the plurality of user selected items specified during each of the plurality of transactions with the at least one specified item into a synchronized list by a one of deleting the at least one specified item from the plurality of user selected items or adding the at least one specified item to the plurality of user selected items.

7. The system according to claim 6 further comprising a broadcast communication circuit for transmitting the synchronized item list to an associated communication network.

8. The system according to claim 7, wherein the data input is configured to receive the second input specifying the at least one specified item from an associated device.

9. The system according to claim 7, wherein the data input is configured to receive the second input specifying the at least one specified item from the associated user.

10. A method of organizing a shopping experience for an associated user, the method comprising:
receiving, by a data input of a portable device from the associated user during each of a plurality of transactions, first input specifying a corresponding plurality of user-selected items;
storing in a non-transitory data storage of the portable device generic assortment data corresponding to each of the plurality of user-selected items, user-defined category data representative of item categories assigned by the associated user to selected ones of the plurality of items included in the generic assortment data, the user-defined category data comprising at least one of a user-defined sales outlet associated with a first set of the plurality of user-selected items, a user-defined location within a sales outlet associated with a second set of the plurality of user-selected items or a user-defined category naming designation associated with a third set of the plurality of user-selected items, and brand data representative of item brand identifications associated with selected ones of the plurality of items included in the generic assortment data;
receiving, by a user input of the portable device a list generation instruction; and,
responsive to the list generation instruction, compiling by a list generator of the portable device the plurality of user-selected items specified during each of the plurality of transactions and to generate categorized item list information including selected generic assortment data items representative of the user-selected items categorized in accordance with the user-defined category data such that the selected generic data items representative of the user-selected items are listed contiguously and associatively with a corresponding user-defined category, and such that at least one brand identification is selectively listed in association with at least one corresponding generic assortment data item.

11. The method of claim 10, further comprising:
generating, by a human interface of the portable device a human readable display representative of the user-selected items categorized in accordance with the user-defined category data.

12. The method of claim 11, further comprising:
storing, by the data storage of the portable device, brand recommendation data as the brand data, the brand recommendation data being representative of brand preference information assigned to selected ones of the plurality of items included in the assortment data; and,
presenting, by the human user interface, preferred brand information corresponding to the brand recommendation data.

13. The method of claim 12, further comprising:
receiving as the brand recommendation data, by the data storage of the portable device, brand advertisement data representative of a promoted brand vendor assigned to selected ones of the plurality of items included in the assortment data; and,
presenting, by the human user interface, advertised brand information corresponding to the brand recommendation data.

14. The method of claim 10, further comprising:
storing, by the data storage of the portable device, coupon data representative of pricing discounts assigned to a plurality of items associated with the selected ones of the plurality of items included in the assortment data; and,
presenting, by the human user interface, coupons corresponding to selected coupon data on a tangible medium in accordance with a predetermined discount price policy.

15. The method according to claim 10 wherein:
the receiving input specifying a corresponding plurality of user-selected items comprises receiving second input specifying at least one specified item; and,
the compiling comprises synchronizing the plurality of user-selected items specified during each of the plurality of transactions with the at least one specified item into a synchronized list by a one of deleting the at least one specified item from the plurality of user selected items or adding the at least one specified item to the plurality of user selected items.

16. The method according to claim 15 further comprising transmitting, by a broadcast communication circuit, the synchronized item list to an associated communication network.

17. The method according to claim 16 wherein the receiving the second input specifying the at least one specified item comprises receiving the second input from an associated device.

18. The method according to claim 16 wherein the receiving the second input specifying the at least one specified item comprises receiving the second input from the associated user.

19. A system for enhancing shopping efficiency of an associated user, the system comprising:
  a data input configured to receive, from the associated user during each of a plurality of transactions, input specifying a corresponding plurality of user-selected items;
  a non-transitory data storage configured for storing generic assortment data corresponding to each of the plurality of user-selected items;
  the data storage further configured for storing user-defined category data representative of item categories assigned by the associated user to selected ones of the plurality of items included in the generic assortment data;
  the data storage further configured for storing promoted brand data representative of one or more sponsored brands assigned to selected ones of the plurality of items included in the generic assortment data;
  a user input configured to receive, from the associated user, a list generation instruction; and,
  a list generator, responsive to the list generation instruction, configured to compile the plurality of user selected items specified during each of the plurality of transactions and to generate categorized item list information including selected generic assortment data items representative of the user-selected items categorized in accordance with the user-defined category data such that selected generic assortment data items representative of the user-selected items are listed contiguously and associatively with a corresponding user-defined category, and such that at least one sponsored brand is selectively listed in association with at least one corresponding generic assortment data item.

20. The system for automated compiling and generating item list information of claim 19, wherein the data storage is further configured for storing user-defined category data representative of item categories generated by the associated user relative to selected ones of the plurality of items included in the assortment data, the user-defined category data comprising at least one of a user-defined sales outlet associated with a one of the plurality of user-selected items, a user-defined location within a sales outlet associated with a one of the plurality of user-selected items or a user-defined designation of an originator of a one of the plurality of user-selected items.

21. The system for automated compiling and generating item list information of claim 19, further comprising means for associatively storing the user-defined category data with at least one of the items in accordance with received user input.

22. The system for automated compiling and generating item list information of claim 19, wherein the user input is further adapted for receiving, from the associated user, data from the set comprising the assortment data and the user-defined category data in a form of alphanumeric data.

23. The system for automated compiling and generating item list information of claim 19, further comprising output means adapted for outputting the item list information representative of the received assortment data in accordance with the user-defined category data.

24. The system for automated compiling and generating item list information of claim 19, wherein the user-defined category data is selected from the group consisting of alphabetical order, similar items, temporal order, and user-defined order.

25. The system for automated compiling and generating item list information of claim 19, wherein the data storage is configured for storing advertisement data representative of one or more promoting vendor sources assigned to selected ones of the plurality of items included in the assortment data.

26. The system for automated compiling and generating item list information of claim 25, wherein the data storage is configured to receive, as the promotion data, brand recommendation data representative of a promoted source category assigned to the selected ones of the plurality of items included in the assortment data.

27. The system for automated compiling and generating item list information of claim 26, wherein the list generator is configured to generate the categorized item list information such that the at least two of the user selected items are listed associatively with the brand recommendation data.

28. The system for automated compiling and generating item list information of claim 25, wherein the data storage is configured to receive, as the advertisement data, coupon data representative of a promoted sales price discount assigned to the selected ones of the plurality of items included in the assortment data.

29. The system for automated compiling and generating item list information of claim 25, further including output means for selectively generating, responsive to a selection input from a user, sales coupon data associated with the coupon data representative of the sales price discount.

30. The system according to claim 19, wherein:
  the data input is configured to receive second input specifying at least one specified item;
  the list generator is configured to selectively synchronize the plurality of user selected items specified during each of the plurality of transactions with the at least one specified item into a synchronized list by a one of deleting the at least one specified item from the plurality of user selected items or adding the at least one specified item to the plurality of user selected items.

31. The system according to claim 30 further comprising a broadcast communication circuit for transmitting the synchronized item list to an associated communication network.

32. The system according to claim 31, wherein the data input is configured to receive the second input specifying the at least one specified item from an associated device.

33. The system according to claim 31, wherein the data input is configured to receive the second input specifying the at least one specified item from the associated user.

34. A method of enhancing shopping efficiency of an associated user, the method comprising:
  receiving, by a data input from an associated user during each of a plurality of transactions, verbal input specifying a corresponding plurality of user-selected items;
  storing in a non-transitory data storage generic assortment data corresponding to each of the plurality of user-selected items;

storing in the data storage user-defined category data representative of item categories assigned by the associated user to selected ones of the plurality of items included in the generic assortment data, the user-defined category data comprising at least one of a user-defined sales outlet associated with a first set of the plurality of user-selected items, a user-defined location within a sales outlet associated with a second set of the plurality of user-selected items or a user-defined naming designation associated with a third set of the plurality of user-selected items;

storing in the data storage user-defined assortment data representative of item brand preferences assigned by the associated user to selected ones of the plurality of items included in the generic assortment data;

storing in the data storage brand data representative of item brand identifications assigned to selected ones of the plurality of items included in the generic assortment data;

receiving, by a user input from the associated user, a list generation instruction; and, responsive to the list generation instruction, compiling by a list generator the plurality of user selected items specified during each of the plurality of transactions and generating categorized item list information including selected generic assortment data items representative of the user-selected items categorized in accordance with the user-defined category data such that the selected generic assortment data items representative of the user-selected items are listed contiguously and associatively with a corresponding user-defined category, and selectively in association with a corresponding user-defined assortment data, and further such that at least one brand identification is listed in association with at least one corresponding generic assortment data item.

35. The method of automated compiling and generating item list information of claim 34, wherein the storing the user-defined category data in the data storage comprises storing user-defined category data representative of item categories generated by the associated user relative to selected ones of the plurality of items included in the assortment data, the user-defined category data comprising at least one of a user-defined sales outlet associated with a one of the plurality of user-selected items, a user-defined location within a sales outlet associated with a one of the plurality of user-selected items or a user-defined designation of an originator of a one of the plurality of user-selected items.

36. The method of automated compiling and generating item list information of claim 34, further comprising associatively storing the user-defined category data with at least one of the items in accordance with received user input.

37. The method of automated compiling and generating item list information of claim 34, further comprising receiving, by the user input from the associated user, data from the set comprising the assortment data and the user-defined category data in a form of alphanumeric data.

38. The method of automated compiling and generating item list information of claim 34, further comprising outputting, by output means, the item list information representative of the received assortment data in accordance with the user-defined category data.

39. The method of automated compiling and generating item list information of claim 34, further comprising the user-defined category data selected from the group consisting of alphabetical order, similar items, temporal order, and user-defined order.

40. The method of automated compiling and generating item list information of claim 34, further comprising storing, in the data storage, paid advertisement data representative of one or more promoting vendor sources associated with selected ones of the plurality of items included in the assortment data.

41. The method of automated compiling and generating item list information of claim 40, further comprising receiving by the data storage as the paid advertisement data, brand recommendation data representative of a promoted source category assigned to the selected ones of the plurality of items included in the assortment data.

42. The method of automated compiling and generating item list information of claim 41, further comprising generating by list generator the categorized item list information such that the at least two of the user selected items are listed associatively with the brand recommendation data.

43. The method of automated compiling and generating item list information of claim 40, further comprising receiving, by the data storage as the paid advertisement data, coupon data representative of a promoted sales price discount assigned to the selected ones of the plurality of items included in the assortment data.

44. The method of automated compiling and generating item list information of claim 40, further comprising selectively generating by the output means responsive to a selection input from a user, sales coupon data associated with the coupon data representative of the sales price discount.

45. The method according to claim 34 wherein:
the receiving input specifying a corresponding plurality of user-selected items comprises receiving second input specifying at least one specified item; and,
the compiling comprises synchronizing the plurality of user-selected items specified during each of the plurality of transactions with the at least one specified item into a synchronized list by a one of deleting the at least one specified item from the plurality of user selected items or adding the at least one specified item to the plurality of user selected items.

46. The method according to claim 45 further comprising transmitting, by a broadcast communication circuit, the synchronized item list to an associated communication network.

47. The method according to claim 46 wherein the receiving the second input specifying the at least one specified item comprises receiving the second input from an associated device.

48. The method according to claim 46 wherein the receiving the second input specifying the at least one specified item comprises receiving the second input from the associated user.

* * * * *